US006982414B2

(12) United States Patent
Bateman et al.

(10) Patent No.: US 6,982,414 B2
(45) Date of Patent: Jan. 3, 2006

(54) METHOD OF MASS SPECTROMETRY AND A MASS SPECTROMETER

(75) Inventors: Robert Harold Bateman, Knutsford (GB); James Ian Langridge, Sale (GB); Therese McKenna, Preston (GB); Keith Richardson, High Peak (GB)

(73) Assignee: Micromass UK Limited, Manchester (GB)

(*) Notice: Subject to any disclaimer, the term of this patent is extended or adjusted under 35 U.S.C. 154(b) by 209 days.

(21) Appl. No.: 10/464,513

(22) Filed: Jun. 19, 2003

(65) Prior Publication Data

US 2004/0041091 A1 Mar. 4, 2004

Related U.S. Application Data

(60) Provisional application No. 60/412,800, filed on Sep. 24, 2002.

(30) Foreign Application Priority Data

Jul. 24, 2002 (GB) ............ 0217146
Aug. 12, 2002 (GB) ............ 0218719
Sep. 20, 2002 (GB) ............ 0221914
Mar. 13, 2003 (GB) ............ 0305796

(51) Int. Cl.
*B01D 59/44* (2006.01)

(52) U.S. Cl. ............ 250/282; 250/281; 250/287; 250/288; 250/290

(58) Field of Classification Search ............ 250/281, 250/282, 287, 288, 290
See application file for complete search history.

(56) References Cited

U.S. PATENT DOCUMENTS 4,851,669 A 7/1989 Aberth
5,073,713 A 12/1991 Smith et al.
5,661,298 A 8/1997 Bateman (Continued)

FOREIGN PATENT DOCUMENTS

EP 898297 2/1999
EP 1006559 6/2000
EP 1 047 107 A3 10/2000

(Continued)

OTHER PUBLICATIONS

Yost et al., "Tandem Quadrupole Mass Spectrometry", John Wiley & Sons, Ch. 8, pp. 175–195, 1983.
Huang et al., "Characterization of Cyclodextrins Using Ion–Evaporation Atmospheric–Pressure Ionization Tandem Mass Spectrometry", Rid Communications in Mass Spectrometry, vol. 4, No. 11, pp. 467–471, 1990.

(Continued)

*Primary Examiner*—John R. Lee
*Assistant Examiner*—David A. Vanore
(74) *Attorney, Agent, or Firm*—Diederiks & Whitelaw, PLC

(57) ABSTRACT

A method of mass spectrometry is disclosed wherein a gas collision cell is repeatedly switched between a fragmentation and a non-fragmentation mode. Parent ions from a first sample are passed through the collision cell and parent ion mass spectra and fragmentation ion mass spectra are obtained. Parent ions from a second sample are then passed through the collision cell and a second set of parent ion mass spectra and fragmentation ion mass spectra are obtained. The mass spectra are then compared and if either certain parent ions or certain fragmentation ions in the two samples are expressed differently then further analysis is performed to seek to identify the ions which are expressed differently in the two different samples.

73 Claims, 14 Drawing Sheets

U.S. PATENT DOCUMENTS

| | | | | | |
|---|---|---|---|---|---|
| 5,885,841 | A | | 3/1999 | Higgs, Jr. et al. | |
| 6,107,623 | A | | 8/2000 | Bateman et al. | |
| 6,204,500 | B1 | | 3/2001 | Whitehouse et al. | |
| 6,323,482 | B1 | | 11/2001 | Clemmer et al. | |
| 6,331,702 | B1 | | 12/2001 | Krutchinsky et al. | |
| 6,586,727 | B2 | * | 7/2003 | Bateman et al. ............ | 250/282 |
| 6,717,130 | B2 | * | 4/2004 | Bateman et al. ............ | 250/282 |
| 6,794,640 | B2 | * | 9/2004 | Bateman et al. ............ | 250/281 |
| 6,835,927 | B2 | | 12/2004 | Becker et al. | |
| 2001/0052569 | A1 | | 12/2001 | Bateman et al. | |
| 2002/0063206 | A1 | | 5/2002 | Bateman et al. | |
| 2002/0115056 | A1 | | 8/2002 | Goodlett | |
| 2002/0119490 | A1 | | 8/2002 | Aebersold et al. | |

FOREIGN PATENT DOCUMENTS

| | | | |
|---|---|---|---|
| GB | 2120007 | | 11/1983 |
| GB | 2300967 | | 11/1996 |
| GB | 2363249 | A | 12/2001 |
| GB | 2364168 | A | 1/2002 |
| WO | WO 2004/049385 | | 6/2004 |

OTHER PUBLICATIONS

Morris et al., "A Novel Geometry Mass Spectrometer, the Q–TQF, for Low–Femtomole/Attomole–Range Biopolymer Sequencing", Journal of Protein Chemistry, vol. 16, No. 5, pp. 469–479, 1997.

Morris et al., "High Sensitivity Collisionally–Activated Decomposition Tandem Mass Spectrometry on a Novel Quadrupole/Orthogonal–Acceleration Time–of–Flight Mass Spectrometer", Rapid Communications in Mass Spectrometry, vol. 10, pp. 879–896, 1996.

Borchers et al., "Preliminary Comparison of Precursor Scans and Liquid Chromatography–Tandem Mass Spectrometry on a Hybrid Quadrupole Time–of–Flight Mass Spectrometer", vol. 13, pp. 1522–1530, 1999.

Chariwood, "Structural Characterization of N–Linked Glycan Mixtures by Precursor Ion Scanning and Tandem Mass Spectrometric Analysis", Rapids Communications in Mass Spectrometry, vol. 13, pp. 1522–1530, 1999.

Hopfgartner et al., "Exact Mass Measurement of Product Ions for the Structural Elucidation of Drug Metabolites with a Tandem Quadrupole Orthogonal–Acceleration Time–of–Flight Mass Spectrometer", Journal of American Society for Mass Spectrometry, vol. 10, pp. 1305–1314, 1999.

Gulcicek et al., "Structural Elucidation in the Millisecond Time Frame Using Fast In–Source CID APO Time–of–Flight MS" ASMS Conference 1998 Book of Abstracts, pp. 891.

* cited by examiner

METHOD OF MASS SPECTROMETRY AND A MASS SPECTROMETER

CROSS-REFERENCE TO RELATED APPLICATIONS

This application claims the benefit of Provisional Patent Application Ser. No. 60/412,800 filed Sep. 24, 2002.

BACKGROUND OF THE INVENTION

1. Field of the Invention

The present invention relates to a method of mass spectrometry and a mass spectrometer.

2. Discussion of the Prior Art

It has become common practice to analyse proteins by first enzymatically or chemically digesting the protein and then analysing the peptide products by mass spectrometry. The mass spectrometry analysis of the peptide products normally entails measuring the mass of the peptide products. This method is sometimes referred to as "peptide mapping" or "peptide fingerprinting".

It is also known to induce peptide ions to fragment and to then measure the mass of one or more fragment ions as a way of seeking to identify the parent peptide ion. The fragmentation pattern of a peptide ion has also been shown to be a successful way of distinguishing isobaric peptide ions. Thus the mass to charge ratio of one or more fragment ions may be used to identify the parent peptide ion and hence the protein from which the peptide was derived. In some instances the partial sequence of the peptide can also be determined from the fragment ion spectrum. This information may be used to determine candidate proteins by searching protein and genomic databases.

Alternatively, a candidate protein may be eliminated or confirmed by comparing the masses of one or more observed fragment ions with the masses of fragment ions which might be expected to be observed based upon the peptide sequence of the candidate protein in question. The confidence in the identification increases as more peptide parent ions are induced to fragment and their fragment masses are shown to match those expected.

SUMMARY OF THE INVENTION

According to a first main aspect of the present invention there is provided a method of mass spectrometry comprising:

passing parent ions from a first sample to a fragmentation device;

repeatedly switching the fragmentation device between a high fragmentation mode wherein at least some of the parent ions from the first sample are fragmented into one or more fragment ions and a low fragmentation mode wherein substantially fewer parent ions are fragmented;

passing parent ions from a second sample to a fragmentation device;

repeatedly switching the fragmentation device between a high fragmentation mode wherein at least some of the parent ions are fragmented into one or more fragment ions and a low fragmentation mode wherein substantially fewer parent ions are fragmented;

automatically determining the intensity of first parent ions from the first sample which have a first mass to charge ratio;

automatically determining the intensity of second parent ions from the second sample which have the same first mass to charge ratio; and comparing the intensity of the first parent ions with the intensity of the second parent ions;

wherein if the intensity of the first parent ions differs from the intensity of the second parent ions by more than a predetermined amount then either the first parent ions and/or the second parent ions are considered to be parent ions of interest.

According to another aspect of the invention there is provided a method of mass spectrometry comprising:

passing parent ions from a first sample to a fragmentation device;

repeatedly switching the fragmentation device between a high fragmentation mode wherein at least some of the parent ions from the first sample are fragmented into one or more fragment ions and a low fragmentation mode wherein substantially fewer parent ions are fragmented;

passing parent ions from a second sample to a fragmentation device;

repeatedly switching the fragmentation device between a high fragmentation mode wherein at least some of the parent ions are fragmented into one or more fragment ions and a low fragmentation mode wherein substantially fewer parent ions are fragmented;

automatically determining the intensity of first parent ions from the first sample which have a first mass to charge ratio;

automatically determining the intensity of second parent ions from the second sample which have the same first mass to charge ratio;

determining a first ratio of the intensity of the first parent ions to the intensity of other parent ions in the first sample;

determining a second ratio of the intensity of the second parent ions to the intensity of other parent ions in the second sample; and comparing the first ratio with the second ratio;

wherein if the first ratio differs from the second ratio by more than a predetermined amount then either the first parent ions and/or the second parent ions are considered to be parent ions of interest.

Other arrangements are also contemplated wherein instead of determining a first ratio of first parent ions to other parent ions, a first ratio of first parent ions to certain fragment ions may be determined. Similarly, a second ratio of second parent ions to certain fragment ions may be determined and the first and second ratios compared.

The other parent ions present in the first sample and/or the other parent ions present in the second sample may either be endogenous or exogenous to the sample. The other parent ions present in the first sample and/or the other parent ions present in the second sample may additionally used as a chromatographic retention time standard.

According to one embodiment parent ions, preferably peptide ions, from two different samples are analysed in separate experimental runs. In each experimental run parent ions are passed to a fragmentation device such as a collision cell. The fragmentation device is repeatedly switched between a fragmentation mode and a substantially non-fragmentation mode. The ions emerging from the fragmentation device are then mass analysed. The intensity of parent ions having a certain mass to charge ratio in one sample are then compared with the intensity of parent ions having the same certain mass to charge ratio in the other sample. A direct comparison of the parent ion expression level may be made or the intensity of parent ions in a sample may first be compared with an internal standard. An indirect comparison may therefore be made between the ratio of parent ions in one sample relative to the intensity of parent ions relating to an internal standard and the ratio of parent ions in the other sample relative to the intensity of parent ions relating to preferably the same internal standard. A comparison of the two ratios may then be made. Although the preferred embodiment is described as relating to comparing the parent ion expression level in two samples, it is apparent that the expression level of parent ions in three or more samples may be compared.

Parent ions may be considered to be expressed significantly differently in two samples if their expression level differs by more than 1%, 10%, 50%, 100%, 150%, 200%, 250%, 300%, 350%, 400%, 450%, 500%, 1000%, 5000% or 10000%.

In the high fragmentation mode the fragmentation device may be supplied with a voltage greater than or equal to 15V, 20V, 25V, 30V, 50V, 100V, 150V or 200V. Similarly, in the low fragmentation mode the fragmentation device may be supplied with a voltage less than or equal to 5V, 4.5V, 4V, 3.5V, 3V, 2.5V, 2V, 1.5V, 1V, 0.5V or substantially OV. However, according to less preferred embodiments, voltages below 15V may be supplied. in the first mode and/or voltages above 5V may be supplied in the second mode. For example, in either the first or the second mode a voltage of around 10V may be supplied. Preferably, the voltage difference between the two modes is at least 5V, 10V, 15V, 20v, 25V, 30V, 35V, 40V, 50V or more than 50V.

According to an embodiment in the high fragmentation mode at least 50% of the ions entering the fragmentation device are arranged to have an energy greater than or equal to 10 eV for a singly charged ion or an energy greater than or equal to 20 eV for a doubly charged ion so that the ions are caused to fragment upon colliding with collision gas in the fragmentation device. The fragmentation device is preferably maintained at a pressure selected from the group consisting of: (i) greater than or equal to 0.0001 mbar; (ii) greater than or equal to 0.001 mbar; (iii) greater than or equal to 0.005 mbar; (iv) greater than or equal to 0.01 mbar; (v) between 0.0001 and 100 mbar; and (vi) between 0.001 and 10 mbar. Preferably, the fragmentation device is maintained at a pressure selected from the group consisting of: (i) greater than or equal to 0.0001 mbar; (ii) greater than or equal to 0.0005 mbar; (iii) greater than or equal to 0.001 mbar; (iv) greater than or equal to 0.005 mbar; (v) greater than or equal to 0.01 mbar; (vi) greater than or equal to 0.05 mbar; (vii) greater than or equal to 0.1 mbar; (viii) greater than or equal to 0.5 mbar; (ix) greater than or equal to 1 mbar; (x) greater than or equal to 5 mbar; and (xi) greater than or equal to 10 mbar. Preferably, the fragmentation device is maintained at a pressure selected from the group consisting of: (i) less than or equal to 10 mbar; (ii) less than or equal to 5 mbar; (iii) less than or equal to 1 mbar; (iv) less than or equal to 0.5 mbar; (v) less than or equal to 0.1 mbar; (vi) less than or equal to 0.05 mbar; (vii) less than or equal to 0.01 mbar; (viii) less than or equal to 0.005 mbar; (ix) less than or equal to 0.001 mbar; (x) less than or equal to 0.0005 mbar; and (xi) less than or equal to 0.0001 mbar.

According to a less preferred embodiment, the collision gas in the fragmentation device may be maintained at a first pressure when the fragmentation device is in the high fragmentation mode and at a second lower pressure when the fragmentation device is in the low fragmentation mode. According to another less preferred embodiment, the collision gas in the fragmentation device may comprise a first collision gas or a first mixture of collision gases when the fragmentation device is in the high fragmentation mode and a second different collision gas or a second different mixture of collision gases when the fragmentation device is in the low fragmentation mode.

Parent ions which are considered to be parent ions of interest are preferably identified. This may comprise determining the mass to charge ratio of the parent ions of interest, preferably accurately to less than or equal to 20 ppm, 15 ppm, 10 ppm or 5 ppm. The determined mass to charge ratio of the parent ions of interest may then be compared with a database of ions and their corresponding mass to charge ratios and hence the identity of the parent ions of interest can be established.

According to the preferred embodiment the step of identifying the parent ions of interest comprises identifying one or more fragment ions which are determined to result from fragmentation of the parent ions of interest. Preferably, the step of identifying one or more fragment ions further comprises determining the mass to charge ratio of the one or more fragment ions to less than or equal to 20 ppm, 15 ppm, 10 ppm or 5 ppm.

The step of identifying first parent ions of interest may comprise determining whether parent ions are observed in a mass spectrum obtained when the fragmentation device is in the low fragmentation mode for a certain time period and the first fragment ions are observed in a mass spectrum obtained either immediately before the certain time period, when the fragmentation device is in the high fragmentation mode, or immediately after the certain time period, when the fragmentation device is in the high fragmentation mode.

The step of identifying first parent ions of interest may comprise comparing the elution times of parent ions with the pseudo-elution time of first fragment ions. The fragment ions are referred to as having a pseudo-elution time since fragment ions do not actually physically elute from a chromatography column. However, since at least some of the fragment ions are fairly unique to particular parent ions, and the parent ions may elute from the chromatography column only at particular times, then the corresponding fragment ions may similarly only be observed at substantially the same elution time as their related parent ions. Similarly, the step of identifying first parent ions of interest may comprise comparing the elution profiles of parent ions with the pseudo-elution profile of first fragment ions. Again, although fragment ions do not actually physically elute from a chromatography column, they can be considered to have an effective elution profile since they will tend to be observed only when specific parent ions elute from the column and as the intensity of the eluting parent ions varies over a few seconds so similarly the intensity of characteristic fragment ions will also vary in a similar manner.

Ions may be determined to be parent ions by comparing two mass spectra obtained one after the other, a first mass spectrum being obtained when the fragmentation device was in a high fragmentation mode and a second mass spectrum obtained when the fragmentation device was in a low fragmentation mode, wherein ions are determined to be parent ions if a peak corresponding to the ions in the second mass spectrum is more intense than a peak corresponding to the ions in the first mass spectrum. Similarly, ions may be determined to be fragment ions if a peak corresponding to the ions in the first mass spectrum is more intense than a peak corresponding to the ions in the second mass spectrum. According to another embodiment, a mass filter may be provided upstream of the fragmentation device wherein the mass filter is arranged to transmit ions having mass to charge ratios within a first range but to substantially attenuate ions having mass to charge ratios within a second range and wherein ions are determined to be fragment ions if they are determined to have a mass to charge ratio falling within the second range.

The first parent ions and the second parent ions are preferably determined to have mass to charge ratios which differ by less than or equal to 40 ppm, 35 ppm, 30 ppm, 25 ppm, 20 ppm, 15 ppm, 10 ppm or 5 ppm. The first parent ions and the second parent ions may have been determined to have eluted from a chromatography column after substantially the same elution time. The first parent ions may also have been determined to have given rise to one or more first fragment ions and the second parent ions may have been determined to have given rise to one or more second fragment ions, wherein the one or more first fragment ions and the one or more second fragment ions have substantially the same mass to charge ratio. The mass to charge ratio of the one or more first fragment ions and the one or more second fragment ions may be determined to differ by less than or equal to 40 ppm, 35 ppm, 30 ppm, 25 ppm, 20 ppm, 15 ppm, 10 ppm or 5 ppm.

The first parent ions may also be determined to have given rise to one or more first fragment ions and the second parent ions may have been determined to have given rise to one or more second fragment ions and wherein the first parent ions and the second parent ions are observed in mass spectra relating to data obtained in the low fragmentation mode at a certain point in time and the one or more first and second fragment ions are observed in mass spectra relating to data obtained either immediately before the certain point in time, when the fragmentation device is in the high fragmentation mode, or immediately after the certain point in time, when the fragmentation device is in the high fragmentation mode.

The first parent ions may be determined to have given rise to one or more first fragment ions and the second parent ions may be determined to have given rise to one or more second fragment ions if the first fragment ions have substantially the same pseudo-elution time as the second fragment ions.

The first parent ions may be determined to have given rise to one or more first fragment ions and the second parent ions may be determined to have given rise to one or more second fragment ions and wherein the first parent ions are determined to have an elution profile which correlates with a pseudo-elution profile of a first fragment ion and wherein the corresponding second parent ions are determined to have an elution profile which correlates with a pseudo-elution profile of a second fragment ion.

According to another embodiment the first parent ions and the second parent ions which are being compared may be determined to be multiply charged. This may rule out a number of fragment ions which quite often tend to be singly charged. The first parent ions and the second parent ions may according to a more preferred embodiment be determined to have the same charge state. According to another embodiment, the parent ions being compared in the two different samples may be determined to give rise to fragment ions which have the same charge state.

The first sample and/or the second sample may comprise a plurality of different biopolymers, proteins, peptides, polypeptides, oligionucleotides, oligionucleosides, amino acids, carbohydrates, sugars, lipids, fatty acids, vitamins, hormones, portions or fragments of DNA, portions or fragments of cDNA, portions or fragments of RNA, portions or fragments of mRNA, portions or fragments of tRNA, polyclonal antibodies, monoclonal antibodies, ribonucleases, enzymes, metabolites, polysaccharides, phosphorylated peptides, phosphorylated proteins, glycopeptides, glycoproteins or steroids. The first sample and/or the second sample may also comprise at least 2, 5, 10, 20, 30, 40, 50, 60, 70, 80, 90, 100, 200, 300, 400, 500, 600, 700, 800, 900, 1000, 1500, 2000, 2500, 3000, 3500, 4000, 4500, or 5000 molecules having different identities.

The first sample may be taken from a diseased organism and the second sample may be taken from a non-diseased organism. Alternatively, the first sample may be taken from a treated organism and the second sample may be taken from a non-treated organism. According to another embodiment the first sample may be taken from a mutant organism and the second sample may be taken from a wild type organism.

Molecules from the first and/or second samples are separated from a mixture of other molecules prior to being ionised by High Performance Liquid Chromatography ("HPLC"), anion exchange, anion exchange chromatography, cation exchange, cation exchange chromatography, ion pair reversed-phase chromatography, chromatography, single dimensional electrophoresis, multi-dimensional electrophoresis, size exclusion, affinity, reverse phase chromatography, Capillary Electrophoresis Chromatography ("CEC"), electrophoresis, ion mobility separation, Field Asymmetric Ion Mobility Separation ("FAIMS") or capillary electrophoresis.

According to a particularly preferred embodiment the first and second sample ions comprise peptide ions. The peptide ions preferably comprise the digest products of one or more proteins. An attempt may be made to identify a protein which correlates with parent peptide ions of interest. Preferably, a determination is made as to which peptide products are predicted to be formed when a protein is digested and it is then determined whether any predicted peptide product(s) correlate with parent ions of interest. A determination may also be made as to whether the parent ions of interest correlate with one or more proteins.

The first and second samples may be taken from the same organism or from different organisms.

A check may be made to confirm that the first and second parent ions being compared really are parent ions rather than fragment ions. A high fragmentation mass spectrum relating to data obtained in the high fragmentation mode may be compared with a low fragmentation mass spectrum relating to data obtained in the low fragmentation mode wherein the mass spectra were obtained at substantially the same time. A determination may be made that the first and/or the second parent ions are not fragment ions if the first and/or the second parent ions have a greater intensity in the low fragmentation mass spectrum relative to the high fragmentation mass spectrum. Similarly, fragment ions may be recognised by noting ions having a greater intensity in the high fragmentation mass spectrum relative to the low fragmentation mass spectrum.

Parent ions from the first sample and parent ions from the second sample are preferably passed to the same fragmentation device. However, according to a less preferred embodiment, parent ions from the first sample and parent ions from the second sample may be passed to different fragmentation devices.

According to another aspect of the present invention there is provided a mass spectrometer comprising:

a fragmentation device repeatedly switched in use between a high fragmentation mode wherein at least some parent ions are fragmented into one or more fragment ions and a low fragmentation mode wherein substantially fewer parent ions are fragmented;

a mass analyser; and a control system which in use:

(i) determines the intensity of first parent ions from a first sample which have a first mass to charge ratio;

(ii) determines the intensity of second parent ions from a second sample which have the same first mass to charge ratio; and (iii) compares the intensity of the first parent ions with the intensity of the second parent ions;

wherein if the intensity of the first parent ions differs from the intensity of the second parent ions by more than a predetermined amount then either the first parent ions and/or the second parent ions are considered to be parent ions of interest.

According to another aspect of the invention there is provided a mass spectrometer comprising:

a fragmentation device repeatedly switched in use between a high fragmentation mode wherein at least some parent ions are fragmented into one or more fragment ions and a low fragmentation mode wherein substantially fewer parent ions are fragmented;

a mass analyser; and a control system which in use:

(i) determines the intensity of first parent ions from a first sample which have a first mass to charge ratio;

(ii) determines the intensity of second parent ions from the second sample which have the same first mass to charge ratio;

(iii) determines a first ratio of the intensity of the first parent ions to the intensity of other parent ions in the first sample;

(iv) determines a second ratio of the intensity of the second parent ions to the intensity of other parent ions in the second sample; and (v) compares the first ratio with the second ratio;

wherein if the first ratio differs from the second ratio by more than a predetermined amount then either the first parent ions and/or the second parent ions are considered to be parent ions of interest.

The mass spectrometer may comprise an Electrospray, Atmospheric Pressure Chemical Ionisation ("APCI"), Atmospheric Pressure Photo Ionisation ("APPI"), Matrix Assisted Laser Desorption Ionisation ("MALDI"), Laser Desorption Ionisation ("LDI"), Inductively Coupled Plasma ("ICP"), Fast Atom Bombardment ("FAB") or Liquid Secondary Ions Mass Spectrometry ("LSIMS") ion source. Such ion sources may be provided with an eluent over a period of time, the eluent having been separated from a mixture by means of liquid chromatography or capillary electrophoresis.

Alternatively, the mass spectrometer may comprise an Electron Impact ("EI"), Chemical Ionisation ("CI") or Field Ionisation ("FI") ion source. Such ion sources may be provided with an eluent over a period of time, the eluent having been separated from a mixture by means of gas chromatography.

The mass analyser preferably comprises a quadrupole mass filter, a Time of Flight ("TOF") mass analyser (an orthogonal acceleration Time of Flight mass analyser is particularly preferred), a 2D (linear) or 3D (doughnut shaped electrode with two endcap electrodes) ion trap, a magnetic sector analyser or a Fourier Transform Ion Cyclotron Resonance ("FTICR") mass analyser.

The fragmentation device may comprise a quadrupole rod set, an hexapole rod set, an octopole or higher order rod set or an ion tunnel comprising a plurality of electrodes having apertures through which ions are transmitted. The apertures are preferably substantially the same size. The fragmentation device may, more generally, comprise a plurality of electrodes connected to an AC or RF voltage supply for radially confining ions within the fragmentation device. An axial DC voltage gradient may or may not be applied along at least a portion of the length of the ion tunnel fragmentation device. The fragmentation device may be housed in a housing or otherwise arranged so that a substantially gas-tight enclosure is formed around the fragmentation device apart from an aperture to admit ions and an aperture for ions to exit from. A collision gas such as helium, argon, nitrogen, air or methane may be introduced into the collision cell.

Other arrangements are also contemplated wherein the fragmentation device is not repeatedly switched between a high fragmentation mode and a low fragmentation mode. For example, the fragmentation device may be left permanently ON and arranged to fragment ions received within the fragmentation device. An electrode or other device may be provided upstream of the fragmentation device. A high fragmentation mode of operation would occur when the electrode or other device allowed ions to pass to the fragmentation device. A low fragmentation mode of operation would occur when the electrode or other device caused ions to by-pass the fragmentation device and hence not be fragmented therein.

Other embodiments are also contemplated which would be useful where particular parent ions could not be easily observed since they co-eluted with other commonly observed peptide ions. In such circumstances the expression level of fragment ions is compared between two samples.

According to another aspect of the invention there is provided a method of mass spectrometry comprising:

passing parent ions from a first sample to a fragmentation device;

repeatedly switching the fragmentation device between a high fragmentation mode wherein at least some of the parent ions from the first sample are fragmented into one or more fragment ions and a low fragmentation mode wherein substantially fewer parent ions are fragmented;

passing parent ions from a second sample to a fragmentation device;

repeatedly switching the fragmentation device between a high fragmentation mode wherein at least some of the parent ions are fragmented into one or more fragment ions and a low fragmentation mode wherein substantially fewer parent ions are fragmented;

automatically determining the intensity of first fragment ions derived from first parent ions from the first sample, the first fragment ions having a first mass to charge ratio;

automatically determining the intensity of second fragment ions derived from second parent ions from the second sample, the second fragment ions having the same first mass to charge ratio; and comparing the intensity of the first fragment ions with the intensity of the second fragment ions;

wherein if the intensity of the first fragment ions differs from the intensity of the second fragment ions by more than a predetermined amount then either the first parent ions and/or the second parent ions are considered to be parent ions of interest.

In a similar manner, according to another aspect of the invention there is provided a method of mass spectrometry comprising:

passing parent ions from a first sample to a fragmentation device;

repeatedly switching the fragmentation device between a high fragmentation mode wherein at least some of the parent ions from the first sample are fragmented into one or more fragment ions and a low fragmentation mode wherein substantially fewer parent ions are fragmented;

passing parent ions from a second sample to a fragmentation device;

repeatedly switching the fragmentation device between a high fragmentation mode wherein at least some of the parent ions are fragmented into one or more fragment ions and a low fragmentation mode wherein substantially fewer parent ions are fragmented;

automatically determining the intensity of first fragment ions derived from first parent ions from the first sample, the first fragment ions having a first mass to charge ratio;

automatically determining the intensity of second fragment ions derived from second parent ions from the second sample, the second fragment ions having the same first mass to charge ratio;

determining a first ratio of the intensity of the first fragment ions to the intensity of other parent ions in the first sample or with the intensity of other fragment ions derived from other parent ions in the first sample;

determining a second ratio of the intensity of the second fragment ions to the intensity of other parent ions in the second sample or with the intensity of other fragment ions derived from other parent ions in the second sample;

comparing the first ratio with the second ratio;

wherein if the first ratio differs from the second ratio by more than a predetermined amount then either the first parent ions and/or the second parent ions are considered to be parent ions of interest.

According to another aspect of the invention there is provided a mass spectrometer comprising:

a fragmentation device repeatedly switched in use between a high fragmentation mode wherein at least some parent ions are fragmented into one or more fragment ions and a low fragmentation mode wherein substantially fewer parent ions are fragmented;

a mass analyser; and a control system which in use:

(i) determines the intensity of first fragment ions derived from first parent ions from the first sample, the first fragment ions having a first mass to charge ratio;

(ii) determines the intensity of second fragment ions derived from second parent ions from the second sample, the second fragment ions having the same first mass to charge ratio; and (iii) compares the intensity of the first fragment ions with the intensity of the second fragment ions;

wherein if the intensity of the first fragment ions differs from the intensity of the second fragment ions by more than a predetermined amount then either the first parent ions and/or the second parent ions are considered to be parent ions of interest.

According to another aspect of the invention there is provided a mass spectrometer comprising:

a fragmentation device repeatedly switched in use between a high fragmentation mode wherein at least some parent ions are fragmented into one or more fragment ions and a low fragmentation mode wherein substantially fewer parent ions are fragmented;

a mass analyser; and a control system which in use:

(i) determines the intensity of first fragment ions derived from first parent ions from the first sample, the first fragment ions having a first mass to charge ratio;

(ii) determines the intensity of second fragment ions derived from second parent ions from the second sample, the second fragment ions having the same first mass to charge ratio;

(iii) determines a first ratio of the intensity of the first fragment ions to the intensity of other parent ions in the first sample or with the intensity of other fragment ions derived from other parent ions in the first sample;

(iv) determines a second ratio of the intensity of the second fragment ions to the intensity of other parent ions in the second sample or with the intensity of other fragment ions derived from other parent ions in the second sample; and (v) compares the first ratio with the second ratio;

wherein if the first ratio differs from the second ratio by more than a predetermined amount then either the first parent ions and/or the second parent ions are considered to be parent ions of interest.

It will be apparent that the above described embodiments which relate to comparing the expression level of fragment rather than parent ions either directly or indirectly may employ the method and apparatus relating to the first main embodiment. Therefore the same preferred features which are recited with respect to the first main embodiment may also be used with the embodiments which relate to comparing the expression level of fragment ions.

A second main embodiment of the present invention is contemplated. According to this embodiment instead of comparing the expression levels of parent ions in two different samples and seeing whether the expression levels are significantly different so as to warrant further investigation, an initial recognition is instead made that parent ions of interest are present in a sample.

According to an aspect of the present invention there is provided a method of mass spectrometry comprising:

passing parent ions from a first sample to a fragmentation device;

repeatedly switching the fragmentation device between a high fragmentation mode wherein at least some of the parent ions from the first sample are fragmented into one or more fragment ions and a low fragmentation mode wherein substantially fewer parent ions are fragmented;

passing parent ions from a second sample to a fragmentation device;

repeatedly switching the fragmentation device between a high fragmentation mode wherein at least some of the parent ions from the second sample are fragmented into one or more fragment ions and a low fragmentation mode wherein substantially fewer parent ions are fragmented;

recognising first parent ions of interest from the first sample;

automatically determining the intensity of the first parent ions of interest, the first parent ions of interest having a first mass to charge ratio;

automatically determining the intensity of second parent ions from the second sample which have the same first mass to charge ratio; and comparing the intensity of the first parent ions of interest with the intensity of the second parent ions.

According to another aspect of the invention, there is provided a method of mass spectrometry comprising:

passing parent ions from a first sample to a fragmentation device;

repeatedly switching the fragmentation device between a high fragmentation mode wherein at least some of the parent ions from the first sample are fragmented into one or more fragment ions and a low fragmentation mode wherein substantially fewer parent ions are fragmented;

passing parent ions from a second sample to a fragmentation device;

repeatedly switching the fragmentation device between a high fragmentation mode wherein at least some of the parent ions from the second sample are fragmented into one or more fragment ions and a low fragmentation mode wherein substantially fewer parent ions are fragmented;

recognising first parent ions of interest from the first sample;

automatically determining the intensity of the first parent ions of interest, the first parent ions of interest having a first mass to charge ratio;

automatically determining the intensity of second parent ions from the second sample which have the same first mass to charge ratio;

determining a first ratio of the intensity of the first parent ions of interest to the intensity of other parent ions in the first sample;

determining a second ratio of the intensity of the second parent ions to the intensity of other parent ions in the second sample; and comparing the first ratio with the second ratio.

It is apparent that the same preferred features which are described above in relation to the first main embodiment may also be provided in relation to the second main embodiment and hence will not be repeated.

According to a preferred embodiment, the step of recognising first parent ions of interest comprises recognising first fragment ions of interest.

The first fragment ions of interest may be optionally identified by, for example, determining their mass to charge ratio preferably to less than or equal to 20 ppm, 15 ppm, 10 ppm or 5 ppm.

Having recognised and optionally identified fragment ions of interest, it is then necessary to determine which parent ion gave rise to that fragment ion.

The step of recognising first parent ions of interest may comprise determining whether parent ions are observed in a mass spectrum obtained when the fragmentation device is in the low fragmentation mode for a certain time period and first fragment ions of interest are observed in a mass spectrum obtained either immediately before the certain time period, when the fragmentation device is in the high fragmentation mode, or immediately after the certain time period, when the fragmentation device is in the high fragmentation mode.

The step of recognising first parent ions of interest may comprise comparing the elution times of parent ions with the pseudo-elution time of first fragment ions of interest. The step of recognising first parent ions of interest may also comprise comparing the elution profiles of parent ions with the pseudo-elution profile of first fragment ions of interest.

According to another less preferred embodiment, parent ions of interest may be recognised immediately by virtue of their mass to charge ratio without it being necessary to recognise and identify fragment ions of interest. According to this embodiment the step of recognising first parent ions of interest preferably comprises determining the mass to charge ratio of the parent ions preferably to less than or equal to 20 ppm, 15 ppm, 10 ppm or 5 ppm. The determined mass to charge ratio of the parent ions may then be compared with a database of ions and their corresponding mass to charge ratios.

According to another embodiment, the step of recognising first parent ions of interest comprises determining whether parent ions give rise to fragment ions as a result of the loss of a predetermined ion or a predetermined neutral particle.

Parent ions of interest may be identified in a similar manner to the first main embodiment.

The other preferred features of the first main embodiment apply equally to the second main embodiment.

According to another aspect of the present invention there is provided a mass spectrometer comprising:

a fragmentation device repeatedly switched in use between a high fragmentation mode wherein at least some parent ions are fragmented into one or more fragment ions and a low fragmentation mode wherein substantially fewer parent ions are fragmented;

a mass analyser; and a control system which in use:

(i) recognises first parent ions of interest from a first sample, the first parent ions of interest having a first mass to charge ratio;

(ii) determines the intensity of the first parent ions of interest;

(iii) determines the intensity of second parent ions from a second sample which have the same first mass to charge ratio; and (iv) compares the intensity of the first parent ions of interest with the intensity of the second parent ions.

According to another aspect of the present invention there is provided a mass spectrometer comprising:

a fragmentation device repeatedly switched in use between a high fragmentation mode wherein at least some parent ions are fragmented into one or more fragment ions and a low fragmentation mode wherein substantially fewer parent ions are fragmented;

a mass analyser; and a control system which in use:

(i) recognises first parent ions of interest from a first sample, the first parent ions of interest having a first mass to charge ratio;

(ii) determines the intensity of the first parent ions of interest;

(iii) determines the intensity of second parent ions from a second sample which have the same first mass to charge ratio;

(iv) determines a first ratio of the intensity of the first parent ions of interest to the intensity of other parent ions in the first sample;

(v) determines a second ratio of the intensity of the second parent ions to the intensity of other parent ions in the second sample; and (vi) compares the first ratio with the second ratio.

It will be apparent that the above described embodiments which relate to recognising parent ions of interest and comparing the expression level of parent ions of interest in one sample with corresponding parent ions in another sample may employ the method and apparatus relating to the first main embodiment. Therefore, the same preferred features which are recited with respect to the first main embodiment may also be used with the embodiments which relate to recognising parent ions of interest and then comparing the expression level of the parent ions of interest in one sample with corresponding parent ions in another sample.

If parent ions having a particular mass to charge ratio are expressed differently in two different samples, then according to the preferred embodiment further investigation of the parent ions of interest then occurs. This further investigation may comprise seeking to identify the parent ions of interest which are expressed differently in the two different samples. In order to verify that the parent ions whose expression levels are being compared in the two different samples really are the same ions, a number of checks may be made.

Measurements of changes in the abundance of proteins in complex protein mixtures can be extremely informative. For example, changes to the abundance of proteins in cells, often referred to as the protein expression level, could be due to different cellular stresses, the effect of stimuli, the effect of disease or the effect of drugs. Such proteins may provide relevant targets for study, screening or intervention. The identification of such proteins will normally be of interest. Such proteins may be identified by the method of the preferred embodiment.

Therefore according to the first main embodiment a new criterion for the discovery of parent ions of interest is based on the quantification of proteins in two different samples. This requires the determination of the relative abundances of their peptide products in two or more samples. However, the determination of relative abundance requires that the same peptide ions must be compared in the two (or more) different samples and ensuring that this happens is a non-trivial problem. Hence, it is necessary to be able to recognise and preferably identify the peptide ion to the extent that it can at least be uniquely recognised within the sample. Such peptide ions may be adequately recognised by measurement of the mass of the parent ion and by measurement of the mass to charge ratio of one or more fragment ions derived from that parent ion. The specificity with which the peptides may be recognised may be increased by the determination of the accurate mass of the parent ion and/or the accurate mass of one or more fragment ions.

The same method of recognising parent ions in one sample is also preferably used to recognise the same parent ions in another sample and this enables the relative abundances of the parent ions in the two different samples to be measured.

Measurement of relative abundances allows discovery of proteins with a significant change or difference in expression level of that protein. The same data allows identification of that protein by the method already described in which several or all fragment ions associated with each such peptide product ion is discovered by closeness of fit of their respective elution times. Again, the accurate measurement of the masses of the parent ion and associated fragment ions substantially improves the specificity and confidence with which the protein may be identified.

The specificity with which the peptides may be recognised may also be increased by comparison of retention times. For example, the HPLC or CE retention or elution times will be measured as part of the procedure for associating fragment ions with parent ions, and these elution times may also be compared for the two or more samples. The elution times may be used to reject measurements where they do not fall within a pre-defined time difference of each other. Alternatively, retention times may be used to confirm recognition of the same peptide when they do fall within a predefined window of each other. Commonly there may be some redundancy if the parent ion accurate mass, one or more fragment ion accurate masses, and the retention times are all measured and compared. In many instances just two of these measurements will be adequate to recognise the same peptide parent ion in the two or more samples. For example, measurement of just the accurate parent ion mass to charge ratio and a fragment ion mass to charge ratio, or the accurate parent ion mass to charge ratio and the retention time, may well be adequate. Nevertheless, the additional measurements may be used to confirm the recognition of the same parent peptide ion.

The relative expression levels of the matched parent peptide ions may be quantified by measuring the peak areas relative to an internal standard.

The preferred embodiment does not require any interruption to the acquisition of data and hence is particularly suitable for quantitative applications. According to an embodiment one or more endogenous peptides common to both mixtures which are not changed by the experimental state of the samples may used as an internal standard or standards for the relative peak area measurements. According to another embodiment an internal standard may be added to each sample where no such internal standard is present or can be relied upon. The internal standard, whether naturally present or added, may also serve as a chromatographic retention time standard as well as a mass accuracy standard.

Ideally more than one peptide parent ion may be measured for each protein to be quantified. For each peptide the same means of recognition is preferably used when comparing intensities in each of the different samples. The measurements of different peptides serves to validate the relative abundance measurements. Furthermore, the measurements from several peptides provides a means of determining the average relative abundance, and of determining the relative significance of the measurements.

According to one embodiment all parent ions may be identified and their relative abundances determined by comparison of their intensities to those of the same identity in one or more other samples.

In another embodiment the relative abundance of all parent ions of the interest, discovered on the basis of their relationship to a predetermined fragment ion, may be determined by comparison of their intensities to those of the same identity in one or more other samples.

In another embodiment the relative abundance of all parent ions of interest, discovered on the basis of their giving rise to a predetermined mass loss, may be determined by comparison of their intensities to those of the same identity in one or more other samples.

In another embodiment it may be merely required to quantify a protein already identified. The protein may be in a complex mixture, and the same means for separation and recognition may be used as that already described. Here it is only necessary to recognise the relevant peptide product or products and measure their intensities in one or more samples. The basis for accurate mass, and that of one or more fragment ion masses, or accurate masses. Their retention times may also be compared thereby providing a means of confirming the recognition of the same peptide or of rejecting unmatched peptides.

The preferred embodiment is applicable to the study of proteomics. However, the same methods of identification and quantification may be used in other areas of analysis such as the study of metabolomics.

The method is appropriate for the analysis of mixtures where different components of the mixture are first separated or partially separated by a means such as chromatography that causes components to elute sequentially.

The source of ions may preferably yield mainly molecular ions or pseudo-molecular ions and relatively few (if any) fragment ions. Examples of such sources include atmospheric pressure ionisation sources (e.g. Electrospray and APCI) and Matrix Assisted Laser Desorption Ionisation (MALDI).

The preferred fragmentation device or collision cell used to fragment ions comprises a chamber containing gas at a sufficient density to ensure that all the ions collide with gas molecules at least once during their transit through the chamber. If the collision energy is set low by using low voltages the collisions do not induce fragmentation. If the collision energy is increased sufficiently then collisions will start to induce fragmentation. The fragmentation ions are also known as fragment ions or product ions. The fragmentation device is preferably operated in at least two distinct operating modes—a first mode, wherein many or most of the sample or parent ions are fragmented to produce fragment ions and a second mode, wherein none or very few of the sample or product ions are fragmented.

If the two main operating modes are suitably set, then parent ions can be recognised by virtue of the fact that they will be relatively more intense in the mass spectrum without substantial fragmentation. Similarly, fragment ions can be recognised by virtue of the fact that they will be relatively more intense in the mass spectrum with substantial fragmentation.

The mass analyser may be a quadrupole, Time of Flight, ion trap, magnetic sector or FT-ICR mass analyser. According to a preferred embodiment the mass analyser should be capable of determining the exact or accurate mass to charge value for ions. This is to maximise selectivity for detection of characteristic fragment ions or mass losses, and to maximise specificity for identification of proteins.

The mass analyser preferably samples or records the whole spectrum simultaneously. This ensures that the elution times observed for all the masses are not modified or distorted by the mass analyser, and in turn would allow accurate matching of the elution times of different masses, such as parent and fragment ions. It also helps to ensure that the quantitative measurements are not compromised by the need to measure abundances of transient signals.

A mass filter, preferably a quadrupole mass filter, may be provided upstream of the collision cell. The mass filter may have a highpass filter characteristic and, for example, be arranged to transmit ions having a mass to charge ratio greater than or equal to 100, 150, 200, 250, 300, 350, 400, 450 or 500. Alternatively, the mass filter may have a lowpass or bandpass filter characteristic.

An ion guide may be provided upstream of the collision cell or fragmentation device. The ion guide may comprise either a hexapole, quadrupole, octopole or higher order multipole rod set. In another embodiment the ion guide may comprise an ion tunnel ion guide comprising a plurality of electrodes having apertures through which ions are transmitted in use. Preferably, at least 90% of the electrodes have apertures which are substantially the same size. Alternatively, the ion guide may comprise a plurality of ring electrodes having substantially tapering internal diameters ("ion funnel").

Parent ions that belong to a particular class of parent ions, and which are recognisable by a characteristic fragment ion or characteristic neutral loss are traditionally discovered by the methods of parent ion scanning or constant neutral loss scanning. Previous methods for recording parent ion scans or constant neutral loss scans involve scanning one or both quadrupoles in a triple quadrupole mass spectrometer, or scanning the quadrupole in a tandem quadrupole orthogonal TOF mass spectrometer, or scanning at least one element in other types of tandem mass spectrometers. As a consequence, these methods suffer from the low duty cycle associated with scanning instruments. As a further consequence, information may be discarded and lost whilst the mass spectrometer is occupied recording a parent ion scan or a constant neutral loss scan. As a further consequence these methods are not appropriate for use where the mass spectrometer is required to analyse substances eluting directly from gas or liquid chromatography equipment.

According to the preferred embodiment, a tandem quadrupole orthogonal TOF mass spectrometer in used in a way in which parent ions of interest are discovered using a method in which sequential low and high collision energy mass spectra are recorded. The switching back and forth is not interrupted. Instead a complete set of data is acquired, and this is then processed afterwards. Fragment ions may be associated with parent ions by closeness of fit of their respective elution times. In this way parent ions of interest may be confirmed or otherwise without interrupting the acquisition of data, and information need not be lost.

According to one embodiment, possible parent ions of interest may be selected on the basis of their relationship to a predetermined fragment ion. The predetermined fragment ion may comprise, for example, immonium ions from peptides, functional groups including phosphate group $PO_3^-$ ions from phosphorylated peptides or mass tags which are intended to cleave from a specific molecule or class of molecule and to be subsequently identified thus reporting the presence of the specific molecule or class of molecule. A parent ion may be short listed as a possible parent ion of interest by generating a mass chromatogram for the predetermined fragment ion using high fragmentation mass spectra. The centre of each peak in the mass chromatogram is then determined together with the corresponding predetermined fragment ion elution time(s). Then for each peak in the predetermined fragment ion mass chromatogram both the low fragmentation mass spectrum obtained immediately before the predetermined fragment ion elution time and the low fragmentation mass spectrum obtained immediately after the predetermined fragment ion elution time are interrogated for the presence of previously recognised parent ions. A mass chromatogram for any previously recognised parent ion found to be present in both the low fragmentation mass spectrum obtained immediately before the predetermined fragment ion elution time and the low fragmentation mass spectrum obtained immediately after the predetermined fragment ion elution time is then generated and the centre of each peak in each mass chromatogram is determined together with the corresponding possible parent ion of interest elution time(s). The possible parent ions of interest may then be ranked according to the closeness of fit of their elution time with the predetermined fragment ion elution time, and a list of final possible parent ions of interest may be formed by rejecting possible parent ions of interest if their elution time precedes or exceeds the predetermined fragment ion elution time by more than a predetermined amount.

According to an alternative embodiment, a parent ion may be shortlisted as a possible parent ion of interest on the basis of it giving rise to a predetermined mass loss. For each low fragmentation mass spectrum, a list of target fragment ion mass to charge values that would result from the loss of a predetermined ion or neutral particle from each previously recognised parent ion present in the low fragmentation mass spectrum is generated. Then both the high fragmentation mass spectrum obtained immediately before the low fragmentation mass spectrum and the high fragmentation mass spectrum obtained immediately after the low fragmentation mass spectrum are interrogated for the presence of fragment ions having a mass to charge value corresponding with a target fragment ion mass to charge value. A list of possible parent ions of interest (optionally including their corresponding fragment ions) is then formed by including in the list a parent ion if a fragment ion having a mass to charge value corresponding with a target fragment ion mass to charge value is found to be present in both the high fragmentation mass spectrum immediately before the low fragmentation mass spectrum and the high fragmentation mass spectrum immediately after the low fragmentation mass spectrum. A mass loss chromatogram may then be generated based upon possible candidate parent ions and their corresponding fragment ions. The centre of each peak in the mass loss chromatogram is determined together with the corresponding mass loss elution time(s). Then for each possible candidate parent ion a mass chromatogram is generated using the low fragmentation mass spectra. A corresponding fragment ion mass chromatogram is also generated for the corresponding fragment ion. The centre of each peak in the possible candidate parent ion mass chromatogram and the corresponding fragment ion mass chromatogram are then determined together with the corresponding possible candidate parent ion elution time(s) and corresponding fragment ion elution time(s). A list of final candidate parent ions may then be formed by rejecting possible candidate parent ions if the elution time of a possible candidate parent ion precedes or exceeds the corresponding fragment ion elution time by more than a predetermined amount.

Once a list of parent ions of interest has been formed (which preferably comprises only some of the originally recognised parent ions and possible parent ions of interest) then each parent ion of interest can then be identified.

Identification of parent ions may be achieved by making use of a combination of information. This may include the accurately determined mass of the parent ion. It may also include the masses of the fragment ions. In some instances the accurately determined masses of the fragment ions may be preferred. It is known that a protein may be identified from the masses, preferably the exact masses, of the peptide products from proteins that have been enzymatically digested. These may be compared to those expected from a library of known proteins. It is also known that when the results of this comparison suggest more than one possible protein then the ambiguity can be resolved by analysis of the fragments of one or more of the peptides. The preferred embodiment allows a mixture of proteins, which have been enzymatically digested, to be identified in a single analysis. The masses, or exact masses, of all the peptides and their associated fragment ions may be searched against a library of known proteins. Alternatively, the peptide masses, or exact masses, may be searched against the library of known proteins, and where more than one protein is suggested the correct protein may be confirmed by searching for fragment ions which match those to be expected from the relevant peptides from each candidate protein.

The step of identifying each parent ion of interest preferably comprises recalling the elution time of the parent ion of interest, generating a list of possible fragment ions which comprises previously recognised fragment ions which are present in both the low fragmentation mass spectrum obtained immediately before the elution time of the parent ion of interest and the low fragmentation mass spectrum obtained immediately after the elution time of the parent ion of interest, generating a mass chromatogram of each possible fragment ion, determining the centre of each peak in each possible fragment ion mass chromatogram, and determining the corresponding possible fragment ion elution time(s). The possible fragment ions may then be ranked according to the closeness of fit of their elution time with the elution time of the parent ion of interest. A list of fragment ions may then be formed by rejecting fragment ions if the elution time of the fragment ion precedes or exceeds the elution time of the parent ion of interest by more than a predetermined amount.

The list of fragment ions may be yet further refined or reduced by generating a list of neighbouring parent ions which are present in the low fragmentation mass spectrum obtained nearest in time to the elution time of the final candidate parent ion. A mass chromatogram of each parent ion contained in the list is then generated and the centre of each mass chromatogram is determined along with the corresponding neighbouring parent ion elution time(s). Any fragment ion having an elution time which corresponds more closely with a neighbouring parent ion elution time than with the elution time of a parent ion of interest may then be rejected from the list of fragment ions.

Fragment ions may be assigned to a parent ion according to the closeness of fit of their elution times, and all fragment ions which have been associated with the parent ion may be listed.

An alternative embodiment which involves a greater amount of data processing but yet which is intrinsically simpler is also contemplated. Once parent and fragment ions have been identified, then a parent ion mass chromatogram for each recognised parent ion is generated. The centre of each peak in the parent ion mass chromatogram and the corresponding parent ion elution time(s) are then determined. Similarly, a fragment ion mass chromatogram for each recognised fragment ion is generated, and the centre of each peak in the fragment ion mass chromatogram and the corresponding fragment ion elution time(s) are then determined. Rather than then identifying only a sub-set of the recognised parent ions, all (or nearly all) of the recognised parent ions are then identified. Fragment ions are assigned to parent ions according to the closeness of fit of their respective elution times and all fragment ions which have been associated with a parent ion may then be listed.

Passing ions through a mass filter, preferably a quadrupole mass filter, prior to being passed to the fragmentation device presents an alternative or an additional method of recognising a fragment ion. A fragment ion may be recognised by recognising ions in a high fragmentation mass spectrum which have a mass to charge ratio which is not transmitted by the fragmentation device i.e. fragment ions are recognised by virtue of their having a mass to charge ratio falling outside of the transmission window of the mass filter. If the ions would not be transmitted by the mass filter then they must have been produced in the fragmentation device.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENTS

Figure 1:
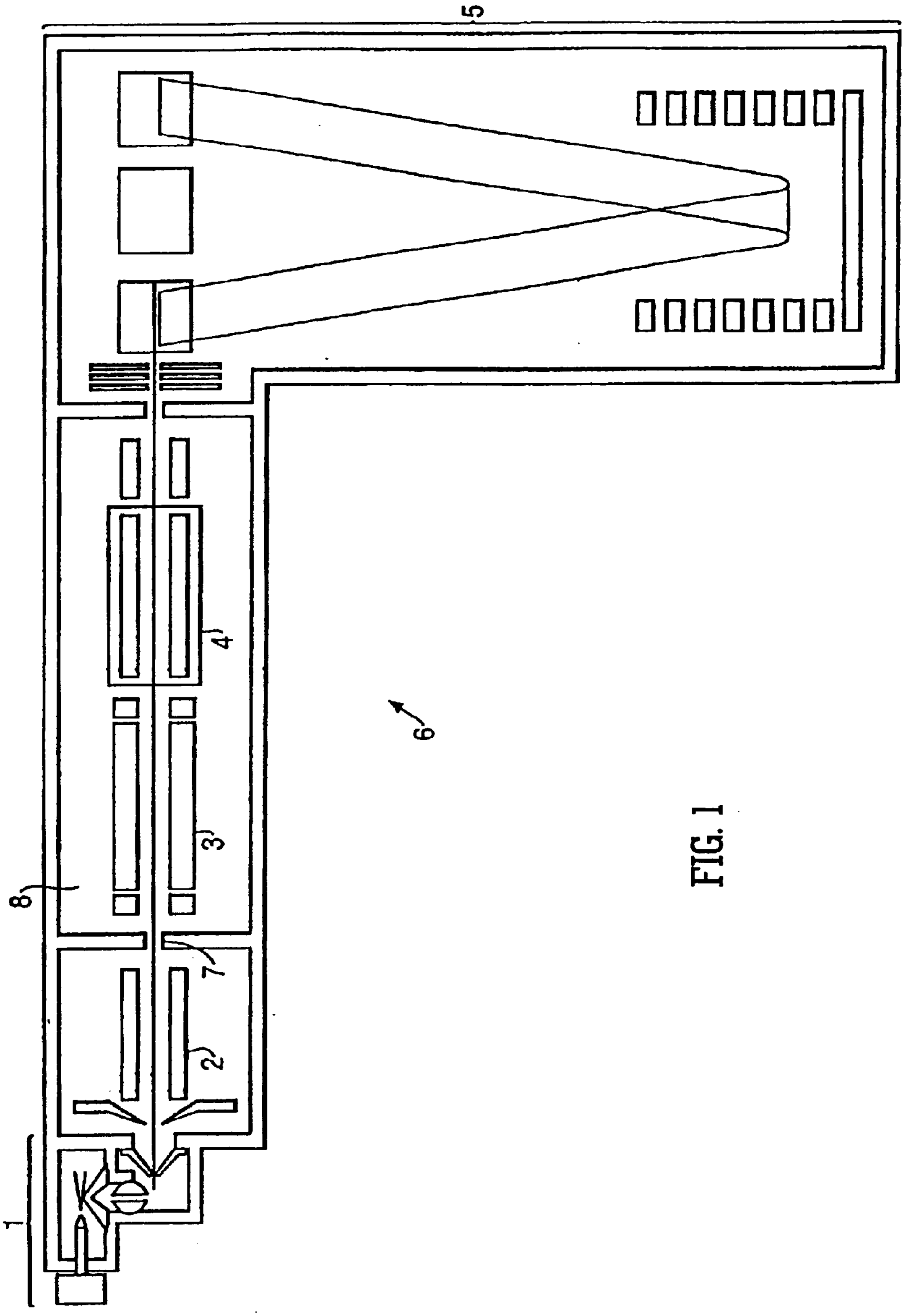
FIG. 1 is a schematic drawing of a preferred mass spectrometer.

A preferred embodiment will now be described with reference to FIG. 1. A mass spectrometer 6 is shown which comprises an ion source 1, preferably an Electrospray Ionisation source, an ion guide 2, a quadrupole mass filter 3, a collision cell or other fragmentation device 4 and an orthogonal acceleration Time of Flight mass analyser 5 incorporating a reflectron. The ion guide 2 and mass filter 3 may be omitted if necessary. The mass spectrometer 6 is preferably interfaced with a chromatograph, such as a liquid chromatograph (not shown) so that the sample entering the ion source 1 may be taken from the eluent of the liquid chromatograph.

The quadrupole mass filter 3 is disposed in an evacuated chamber which is maintained at a relatively low pressure e.g. less than $10^{-5}$ mbar. The rod electrodes comprising the mass filter 3 are connected to a power supply which generates both RF and DC potentials which determine the mass to charge value transmission window of the mass filter 3.

The collision cell 4 preferably comprises either a quadrupole or hexapole rod set which may be enclosed in a substantially gas-tight casing (other than having a small ion entrance and exit orifice) into which a collision gas such as helium, argon, nitrogen, air or methane may be introduced at a pressure of between $10^{-4}$ and $10^{-1}$ mbar, further preferably $10^{-3}$ mbar to $10^{-2}$ mbar. Suitable AC or RF potentials for the electrodes comprising the collision cell 4 are provided by a power supply (not shown).

Ions generated by the ion source 1 are transmitted by ion guide 2 and pass via an interchamber orifice 7 into vacuum chamber 8. Ion guide 2 is maintained at a pressure intermediate that of the ion source and the vacuum chamber 8. In the embodiment shown, ions are mass filtered by mass filter 3 before entering collision cell 4. However, the mass filter 3 is an optional feature of this embodiment. Ions exiting from the collision cell 4 pass into a Time of Flight mass analyser 5. Other ion optical components, such as further ion guides and/or electrostatic lenses, may be provided which are not shown in the figures or described herein. Such components may be used to maximise ion transmission between various parts or stages of the apparatus. Various vacuum pumps (not shown) may be provided for maintaining optimal vacuum conditions. The Time of Flight mass analyser 5 incorporating a reflectron operates in a known way by measuring the transit time of the ions comprised in a packet of ions so that their mass to charge ratios can be determined.

A control means (not shown) provides control signals for the various power supplies (not shown) which respectively provide the necessary operating potentials for the ion source 1, ion guide 2, quadrupole mass filter 3, collision cell 4 and the Time of Flight mass analyser 5. These control signals determine the operating parameters of the instrument, for example the mass to charge ratios transmitted through the mass filter 3 and the operation of the analyser 5. The control means may be a computer (not shown) which may also be used to process the mass spectral data acquired. The computer can also display and store mass spectra produced by the analyser 5 and receive and process commands from an operator. The control means may be automatically set to perform various methods and make various determinations without operator intervention, or may optionally require operator input at various stages.

The control means is also preferably arranged to switch the collision cell or other fragmentation device 4 back and forth repeatedly and/or regularly between at least two different modes. In one mode a relatively high voltage such as greater than or equal to 15V is applied to the collision cell 4 which in combination with the effect of various other ion optical devices upstream of the collision cell 4 is sufficient to cause a fair degree of fragmentation of ions passing therethrough. In a second mode a relatively low voltage such as less than or equal to 5V is applied which causes relatively little (if any) significant fragmentation of ions passing therethrough.

In one embodiment the control means may switch between modes approximately every second. When the mass spectrometer 6 is used in conjunction with an ion source 1 being provided with an eluent separated from a mixture by means of liquid or gas chromatography, the mass spectrometer 6 may be run for several tens of minutes over which period of time several hundred high and low fragmentation mass spectra may be obtained.

At the end of the experimental run the data which has been obtained is analysed and parent ions and fragment ions can be recognised on the basis of the relative intensity of a peak in a mass spectrum obtained when the collision cell 4 was in one mode compared with the intensity of the same peak in a mass spectrum obtained approximately a second later in time when the collision cell 4 was in the second mode.

According to an embodiment, mass chromatograms for each parent and fragment ion are generated and fragment ions are assigned to parent ions on the basis of their relative elution times.

An advantage of this method is that since all the data is acquired and subsequently processed then all fragment ions may be associated with a parent ion by closeness of fit of their respective elution times. This allows all the parent ions to be identified from their fragment ions, irrespective of whether or not they have been discovered by the presence of a characteristic fragment ion or characteristic "neutral loss".

According to another embodiment an attempt is made to reduce the number of parent ions of interest. A list of possible (i.e. not yet finalised) parent ions of interest may be formed by looking for parent ions which may have given rise to a predetermined fragment ion of interest e.g. an immonium ion from a peptide. Alternatively, a search may be made for parent and fragment ions wherein the parent ion could have fragmented into a first component comprising a predetermined ion or neutral particle and a second component comprising a fragment ion. Various steps may then be taken to further reduce/refine the list of possible parent ions of interest to leave a number of parent ions of interest which are then preferably subsequently identified by comparing elution times of the parent ions of interest and fragment ions. As will be appreciated, two ions could have similar mass to charge ratios but different chemical structures and hence would most likely fragment differently enabling a parent ion to be identified on the basis of a fragment ion.

Figure 2:
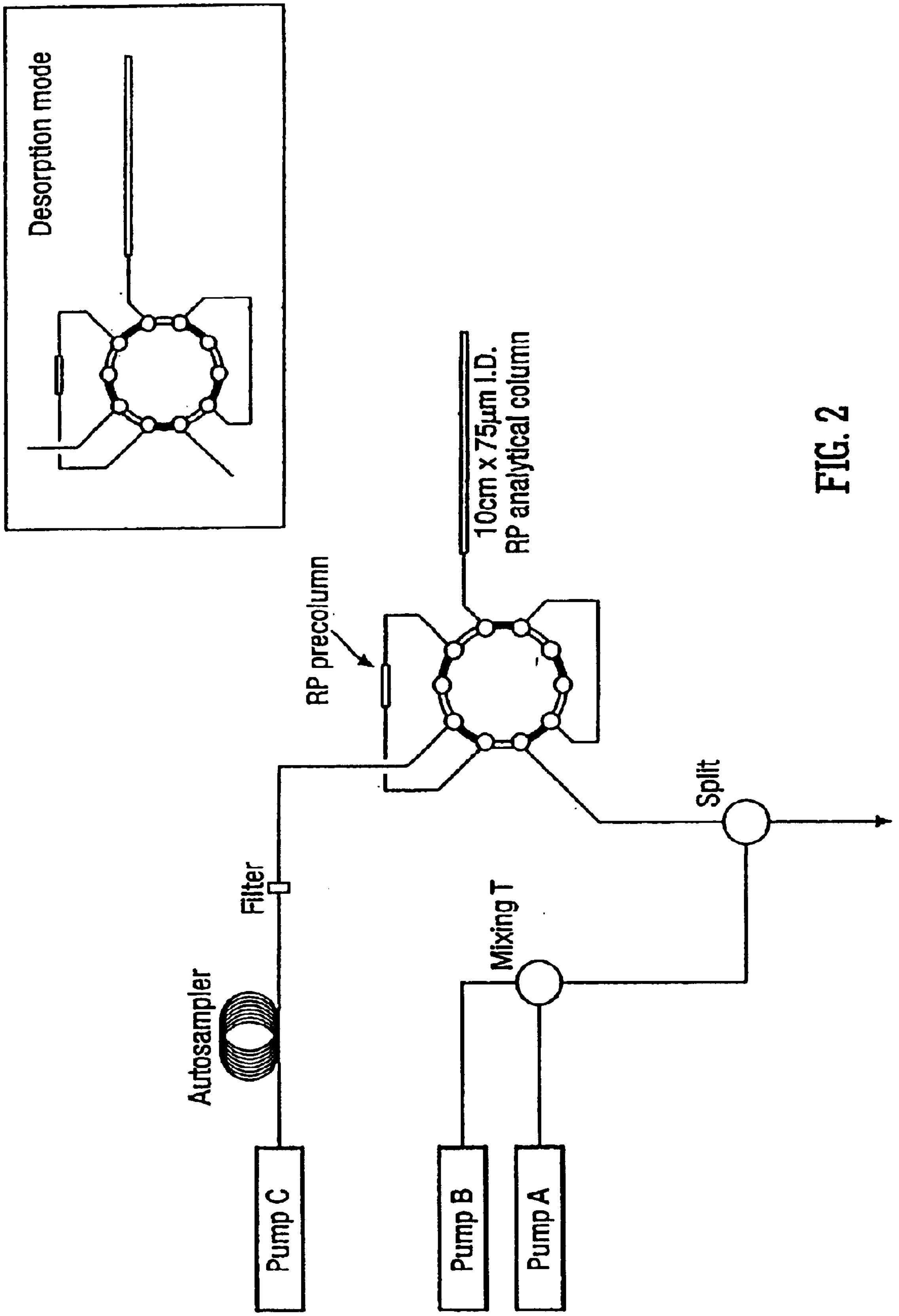
FIG. 2 shows a schematic of a valve switching arrangement during sample loading and desalting and the inset shows desorption of a sample from an analytical column.

A sample introduction system is shown in more detail in FIG. 2. Samples may be introduced into the mass spectrometer 6 by means of a Micromass (RTM) modular CapLC system. For example, samples may be loaded onto a C18 cartridge (0.3 mm×5 mm) and desalted with 0.1% HCOOH for 3 minutes at a flow rate of 30 $\mu$L per minute. A ten port valve may then switched such that the peptides are eluted onto the analytical column for separation, see inset of FIG. 2. Flow from two pumps A and B may be split to produce a flow rate through the column of approximately 200 nl/min.

A preferred analytical column is a PicoFrit (RTM) column packed with Waters (RTM) Symmetry C18 set up to spray directly into the mass spectrometer 6. An electrospray potential (ca. 3 kV) may be applied to the liquid via a low dead volume stainless steel union. A small amount e.g. 5 psi (34.48 kPa) of nebulising gas may be introduced around the spray tip to aid the electrospray process.

Data can be acquired using a mass spectrometer 6 fitted with a Z-spray (RTM) nanoflow electrospray ion source. The mass spectrometer may be operated in the positive ion mode with a source temperature of 80° C. and a cone gas flow rate of 40 l/hr.

The instrument may be calibrated with a multi-point calibration using selected fragment ions that result, for example, from the collision-induced decomposition (CID) of Glu-fibrinopeptide b. Data may be processed using the MassLynx (RTM) suite of software.

Figure 3A:
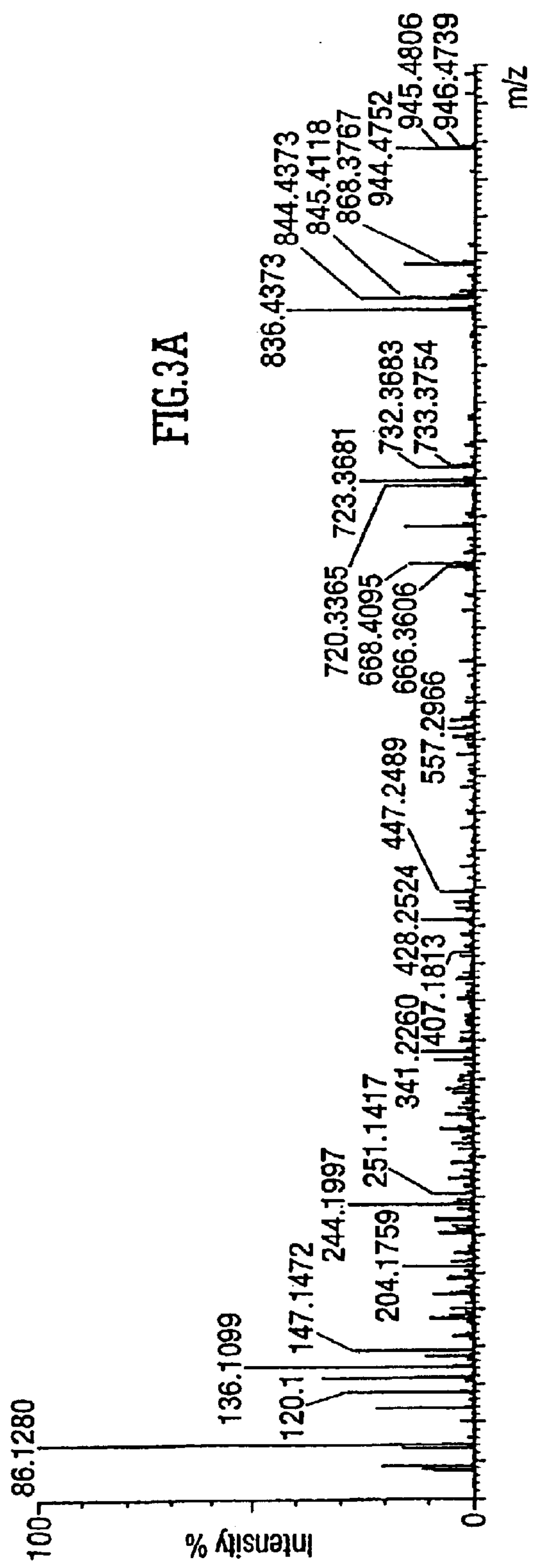
FIG. 3A shows a fragment ion mass spectrum and FIG. 3B shows the corresponding parent ion mass spectrum obtained when a mass filter upstream of the fragmentation device was arranged so as to transmit ions having a m/z >350 to the fragmentation device.
Figure 3B:
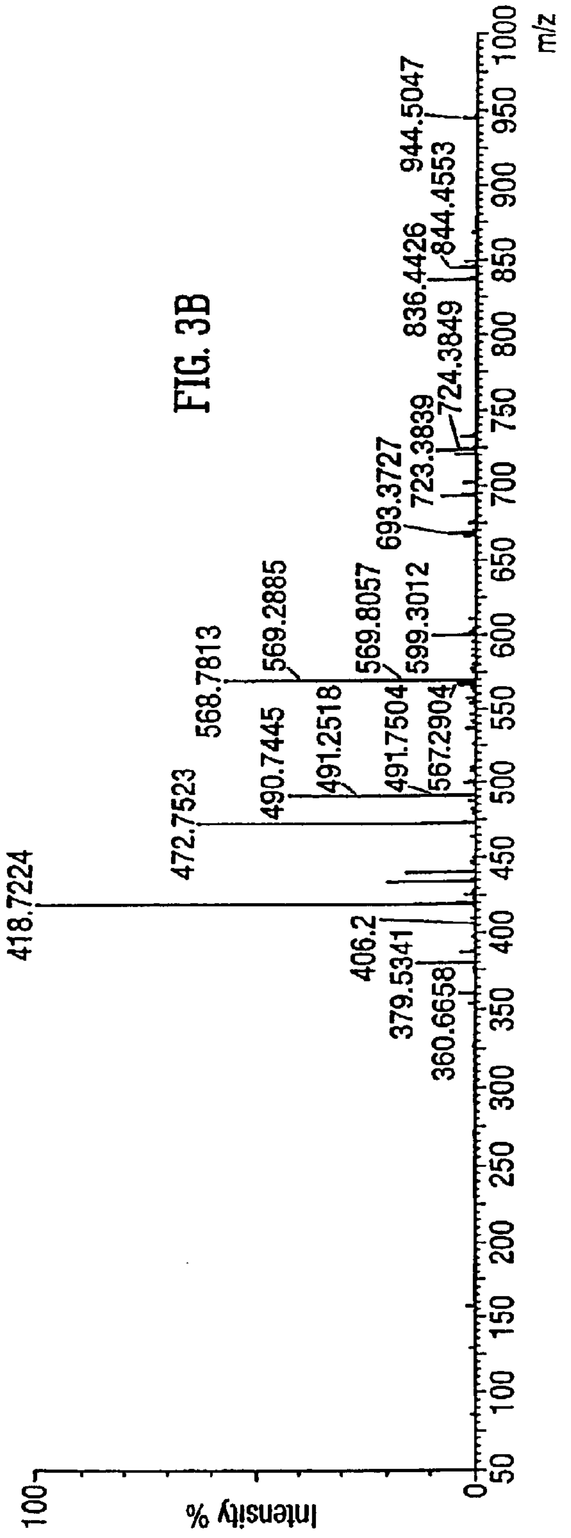
Figure 4A:
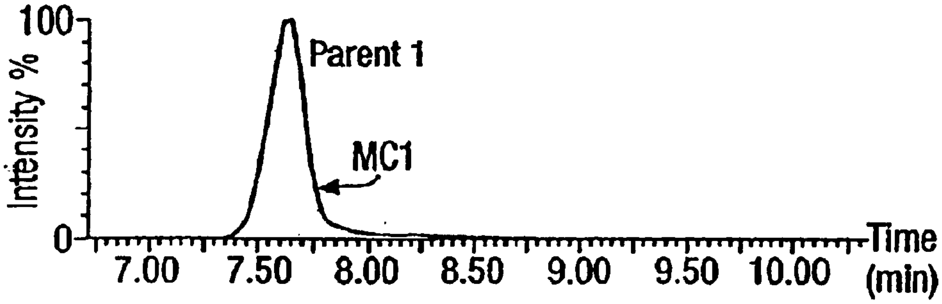
FIG. 4A shows a mass chromatogram of a parent ion.
Figure 4B:
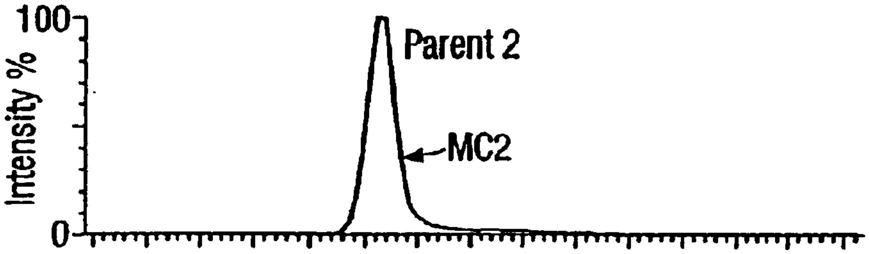
FIG. 4B shows a mass chromatogram of a parent ion.
Figure 4C:
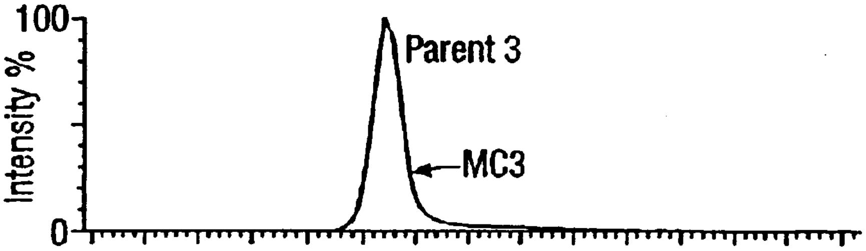
FIG. 4C shows a mass chromatogram of a parent ion.
Figure 4D:
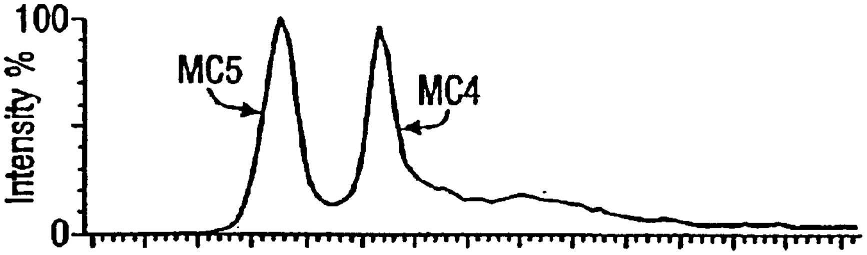
FIG. 4D shows a mass chromatogram of a fragment ion and FIG. 4E shows a mass chromatogram of a fragment ion.
Figure 4E:
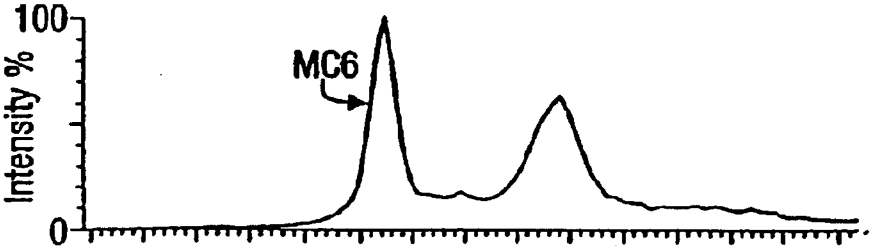

FIGS. 3A and 3B show respectively fragment and parent ion spectra of a tryptic digest of alcohol dehydrogenase (ADH). The fragment ion spectrum shown in FIG. 3A was obtained while the collision cell voltage was high, e.g. around 30V, which resulted in significant fragmentation of ions passing therethrough. The parent ion spectrum shown in FIG. 3B was obtained at low collision energy e.g. less than or equal to 5V. The data presented in FIG. 3B was obtained using a mass filter 3 upstream of collision cell 4 and set to transmit ions having a mass to charge value greater than 350. The mass spectra in this particular example were obtained from a sample eluting from a liquid chromatograph, and the spectra were obtained sufficiently rapidly and close together in time that they essentially correspond to the same component or components eluting from the liquid chromatograph.

In FIG. 3B, there are several high intensity peaks in the parent ion spectrum, e.g. the peaks at 418.7724 and 568.7813, which are substantially less intense in the corresponding fragment ion spectrum shown in FIG. 3A. These peaks may therefore be recognised as being parent ions. Likewise, ions which are more intense in the fragment ion spectrum shown in FIG. 3A than in the parent ion spectrum shown in FIG. 3B may be recognised as being fragment ions. As will also be apparent, all the ions having a mass to charge value less than 350 in the high fragmentation mass spectrum shown in FIG. 3A can be readily recognised as being fragment ions on the basis that they have a mass to charge value less than 350 and the fact that only parent ions having a mass to charge value greater than 350 were transmitted by the mass filter 5 to the collision cell 4.

FIGS. 4A–E show respectively mass chromatograms for three parent ions and two fragment ions. The parent ions were determined to have mass to charge ratios of 406.2 (peak "MC1"), 418.7 (peak "MC2") and 568.8 (peak "MC3") and the two fragment ions were determined to have mass to charge ratios of 136.1 (peaks "MC4" and "MC5") and 120.1 (peak "MC6").

It can be seen that parent ion peak MC1 (m/z 406.2) correlates well with fragment ion peak MC5 (m/z 136.1) i.e. a parent ion with a mass to charge ratio of 406.2 seems to have fragmented to produce a fragment ion with a mass to charge ratio of 136.1. Similarly, parent ion peaks MC2 and MC3 correlate well with fragment ion peaks MC4 and MC6, but it is difficult to determine which parent ion corresponds with which fragment ion.

Figure 5:
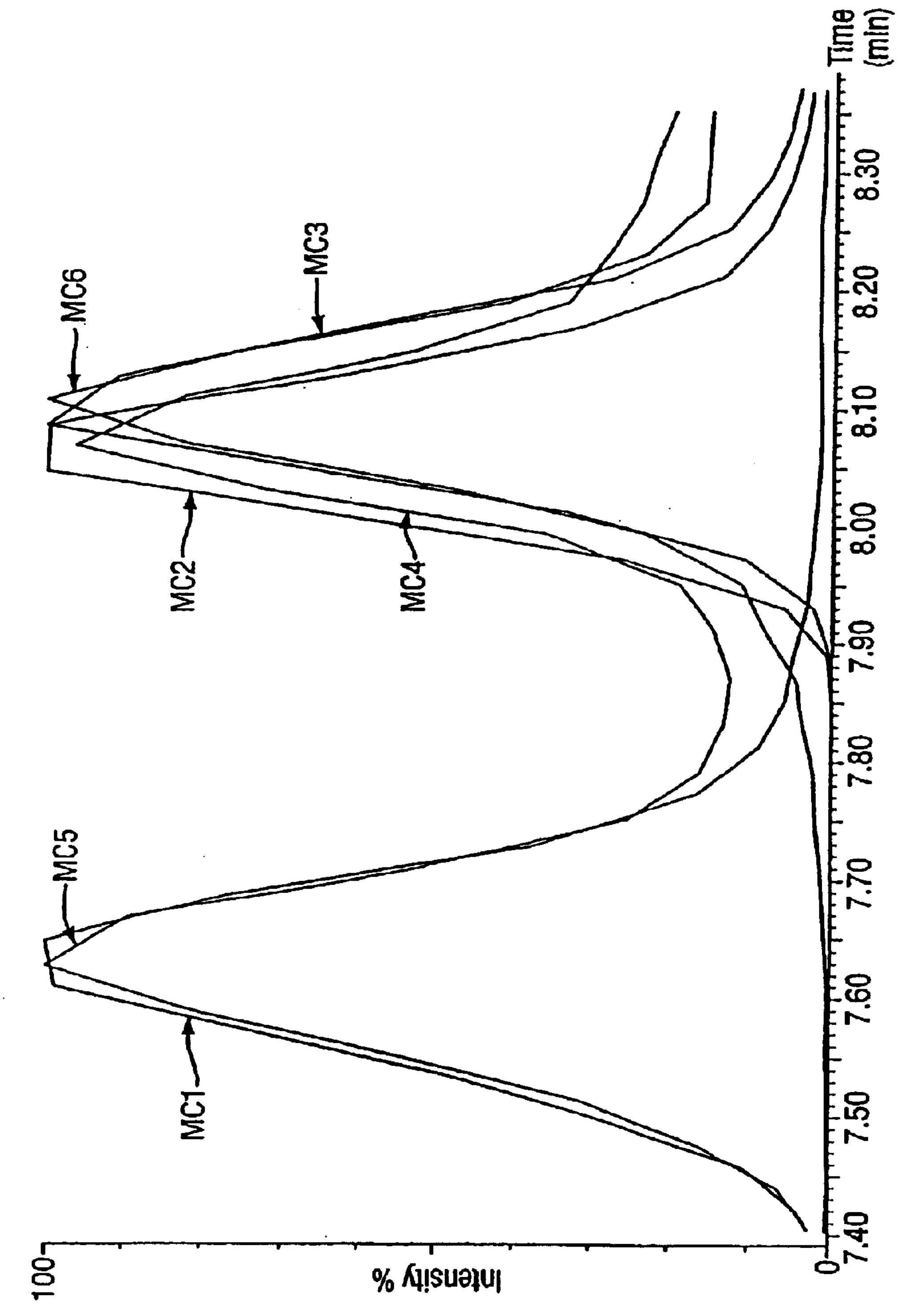
FIG. 5 shows the mass chromatograms of FIGS. 4A–E superimposed upon one another.

FIG. 5 shows the peaks of FIGS. 4-E overlaid on top of one other and redrawn at a different scale. By careful comparison of the peaks of MC2, MC3, MC4 and MC6 it can be seen that in fact parent ion MC2 and fragment ion MC4 correlate well whereas parent ion MC3 correlates well with fragment ion MC6. This suggests that parent ions with a mass to charge ratio of 418.7 fragmented to produce fragment ions with a mass to charge ratio of 136.1 and that parent ions with mass to charge ratio 568.8 fragmented to produce fragment ions with a mass to charge ratio of 120.1.

This cross-correlation of mass chromatograms may be carried out using automatic peak comparison means such as a suitable peak comparison software program running on a suitable computer.

Figure 6:
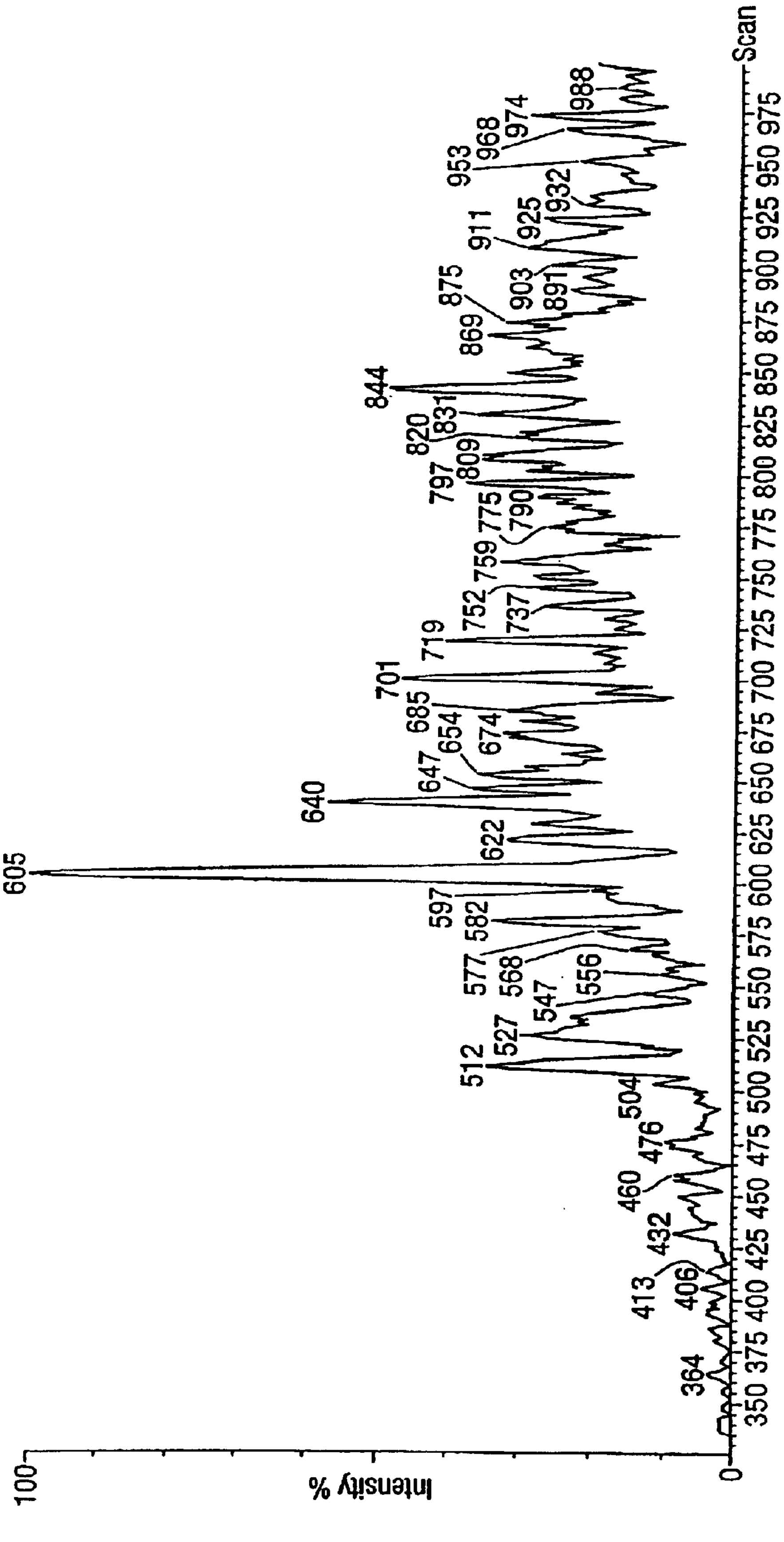
FIG. 6 shows a mass chromatogram of the Asparagine immonium ion which has a mass to charge ratio of 87.04.
Figure 7:
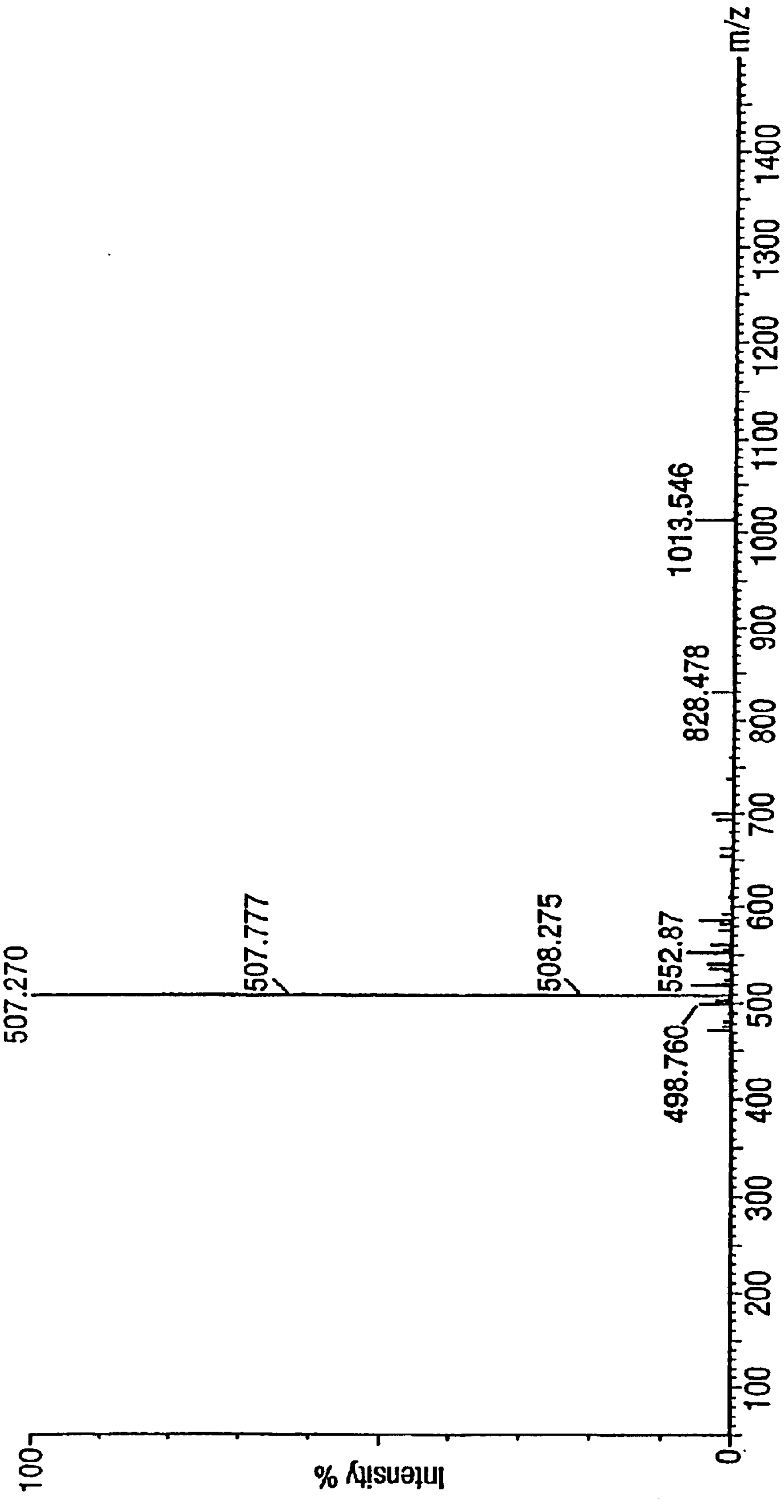
FIG. 7 shows a mass spectrum of the peptide ion T5 derived from ADH which has the sequence ANELLINVK and a molecular weight of 1012.59.

FIG. 6 show the mass chromatogram for the fragment ion having a mass to charge ratio of 87.04 extracted from a HPLC separation and mass analysis obtained using mass spectrometer 6. It is known that the immonium ion for the amino acid Asparagine has a mass to charge value of 87.04. This chromatogram was extracted from all the high energy spectra recorded on the mass spectrometer 6. FIG. 7 shows the full mass spectrum corresponding to scan number 604. This was a low energy mass spectrum recorded on the mass spectrometer 6, and is the low energy spectrum next to the high energy spectrum at scan 605 that corresponds to the largest peak in the mass chromatogram of mass to charge ratio 87.04. This shows that the parent ion for the Asparagine immonium ion at mass to charge ratio 87.04 has a mass of 1012.54 since it shows the singly charged $(M+H)^+$ ion at mass to charge ratio 1013.54, and the doubly charged $(M+2H)^{++}$ ion at mass to charge ratio 507.27.

Figure 8:
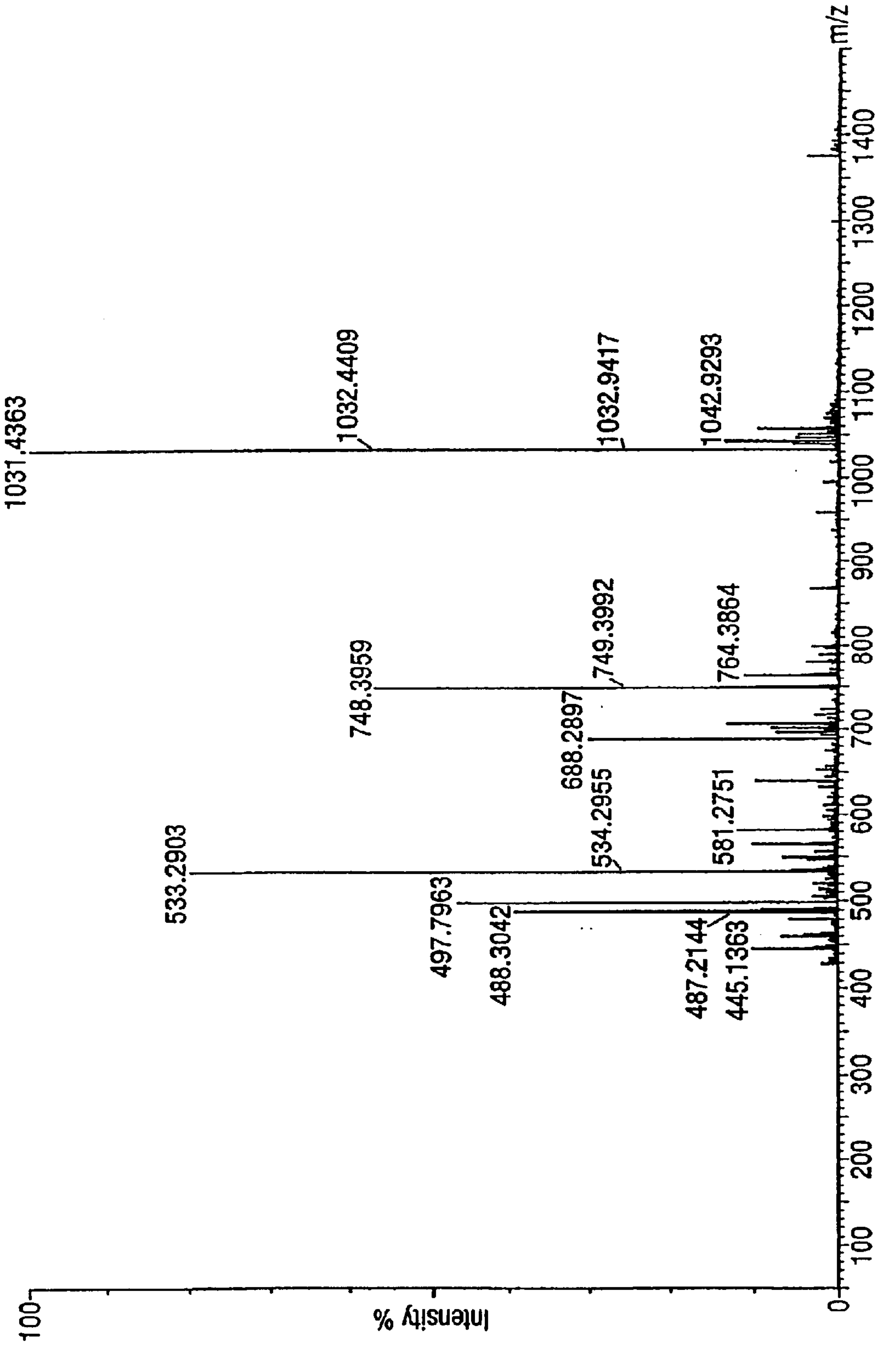
FIG. 8 shows a mass spectrum of a tryptic digest of β-Casein obtained when the fragmentation device was in a low fragmentation mode.
Figure 9:
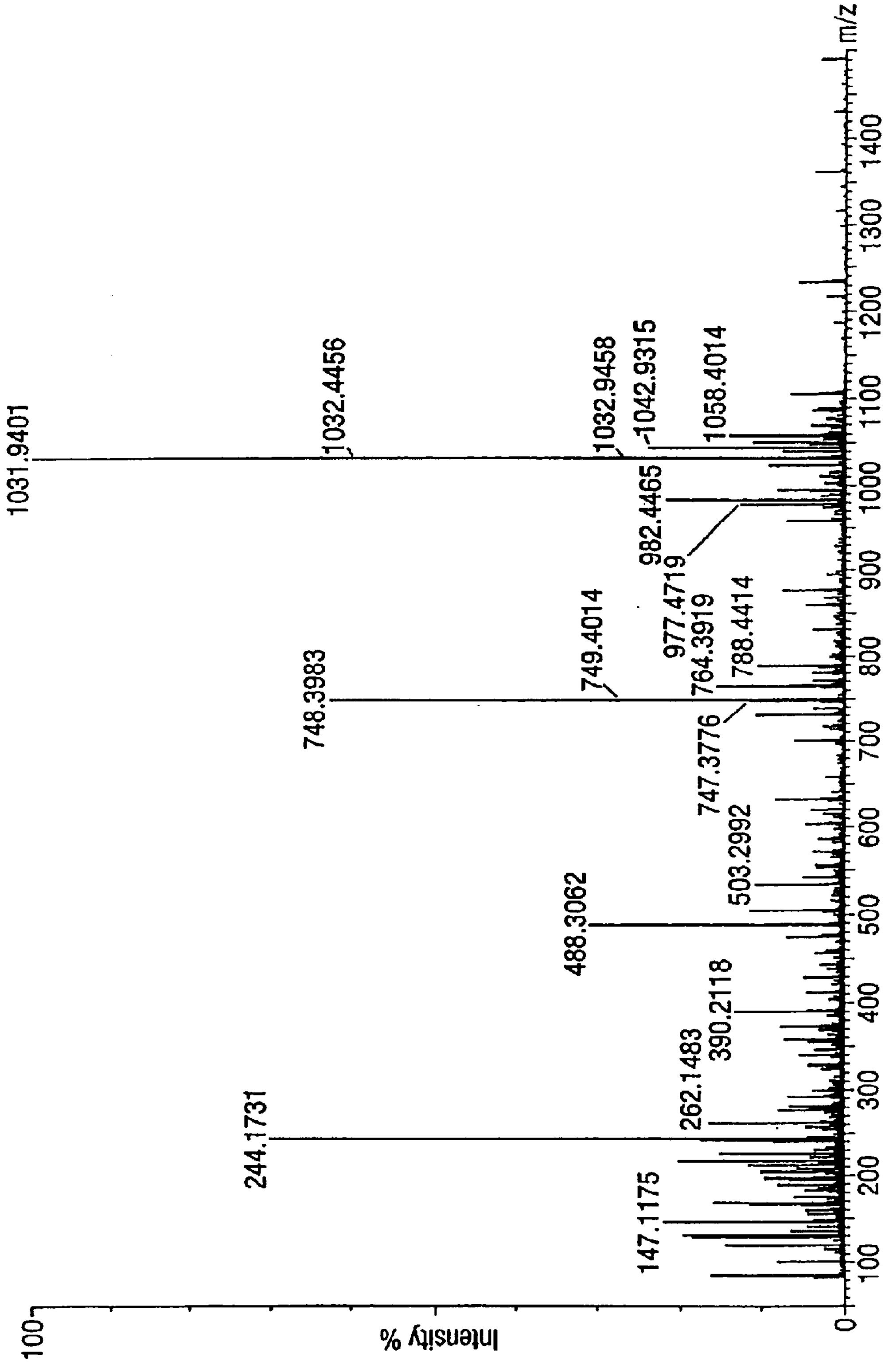
FIG. 9 shows mass spectrum of a tryptic digest of β-Casein obtained when the fragmentation device was in a high fragmentation mode.
Figure 10:
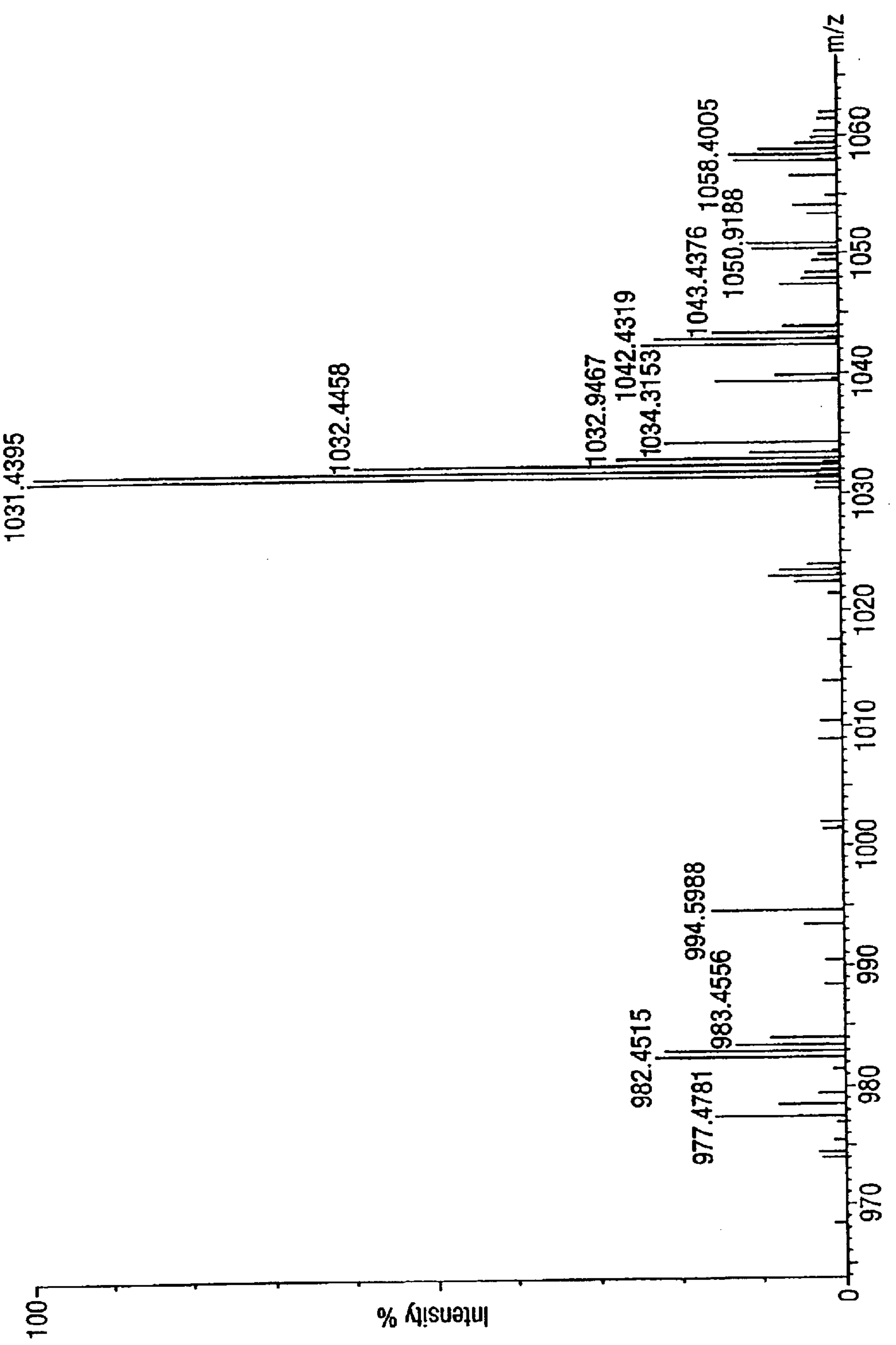
FIG. 10 shows a processed and expanded view of the mass spectrum shown in FIG. 9.

FIG. 8 shows a mass spectrum from the low energy spectra recorded on mass spectrometer 6 of a tryptic digest of the protein β-Casein. The protein digest products were separated by HPLC and mass analysed. The mass spectra were recorded on the mass spectrometer 6 operating in the MS mode and alternating between low and high collision energy in the gas collision cell 4 for successive spectra. FIG. 9 shows a mass spectrum from the high energy spectra recorded at substantially the same time that the low energy mass spectrum shown in FIG. 8 relates to. FIG. 10 shows a processed and expanded view of the mass spectrum shown in FIG. 9 above. For this spectrum, the continuum data has been processed so as to identify peaks and display them as lines with heights proportional to the peak area, and annotated with masses corresponding to their centroided masses. The peak at mass to charge ratio 1031.4395 is the doubly charged $(M+2H)^{++}$ ion of a peptide, and the peak at mass to charge ratio 982.4515 is a doubly charged fragment ion. It has to be a fragment ion since it is not present in the low energy spectrum. The mass difference between these ions is 48.9880. The theoretical mass for $H_3PO_4$ is 97.9769, and the mass to charge value for the doubly charged $H_3PO_4^{++}$ ion is 48.9884, a difference of only 8 ppm from that observed. It is therefore assumed that the peak having a mass to charge ratio of 982.4515 relates to a fragment ion resulting from a peptide ion having a mass to charge of 1031.4395 losing a $H_3PO_4^{++}$ ion.

Some experimental data is now presented which illustrates the ability of the preferred embodiment to quantify the relative abundance of two proteins contained in two different samples which comprise a mexture of proteins.

A first sample contained the tryptic digest products of three proteins BSA, Glycogen Phosphorylase B and Casein. These three proteins were initially present in the ratio 1:1:1. Each of the three proteins had a concentration of 330 fmol/μl. A second sample contained the tryptic digest products of the same three proteins BSA, Glycogen Phosphorylase B and Casein. However, the proteins were initially present in the ratio 1:1:X. X was uncertain but believed to be in the range 2–3. The concentration of the proteins BSA and Glycogen Phosphorylase B in the second sample mixture was the same as in the first sample, namely 330 fmol/μl.

The experimental protocol which was followed was that 1 μl of sample was loaded for separation on to a HPLC column at a flow rate of 4 μl/min. The liquid flow was then split such that the flow rate to the nano-electrospray ionisation source was approximately 200 nl/min.

Mass spectra were recorded on the mass spectrometer 6. Mass spectra were recorded at alternating low and high collision energy using nitrogen collision gas. The low-collision energy mass spectra were recorded at a collision voltage of 10V and the high-collision energy mass spectra were recorded at a collision voltage of 33V. The mass spectrometer was fitted with a Nano-Lock-Spray device which delivered a separate liquid flow to the source which may be occasionally sampled to provide a reference mass from which the mass calibration may be periodically validated. This ensured that the mass measurements were accurate to within an RMS accuracy of 5 ppm. Data were recorded and processed using the MassLynx (RTM) data system.

The first sample was initially analysed and the data was used as a reference. The first sample was then analysed a further two times. The second sample was analysed twice. The data from these analyses were used to attempt to quantify the (unknown) relative abundance of Casein in the second sample.

All data files were processed automatically generating a list of ions with associated areas and high-collision energy spectra for each experiment. This list was then searched against the Swiss-Prot protein database using the ProteinLynx (RTM) search engine. Chromatographic peak areas were obtained using the Waters (RTM) Apex Peak Tracking algorithm. Chromatograms for each charge state found to be present were summed prior to integration.

The experimentally determined relative expression level of various peptide ions normalised with respect to the reference data for the two samples are given in the following tables.

| | Sample 1 Run 1 | Sample 1 Run 2 | Sample 2 Run 1 | Sample 2 Run 2 |
|---|---|---|---|---|
| BSA peptide ions | | | | |
| FKDLGEEHFK | 0.652 | 0.433 | 0.914 | 0.661 |
| HLVDEPQNLIK | 0.905 | 0.829 | 0.641 | 0.519 |
| KVPQVSTPTLVEVSR | 1.162 | 0.787 | 0.629 | 0.635 |
| LVNELTEFAK | 1.049 | 0.795 | 0.705 | 0.813 |
| LGEYGFQNALIVR | 1.278 | 0.818 | 0.753 | 0.753 |
| AEFVEVTK | 1.120 | 0.821 | 0.834 | 0.711 |
| Average | 1.028 | 0.747 | 0.746 | 0.682 |
| Glycogen Phophorylase B pepticle ions | | | | |
| VLVDLER | 1.279 | 0.751 | n/a | 0.701 |
| TNFDAFPDK | 0.798 | 0.972 | 0.691 | 0.699 |
| EIWGVEPSR | 0.734 | 0.984 | 1.053 | 1.054 |
| LITAIGDVVNHDPVVGDR | 1.043 | 0.704 | 0.833 | 0.833 |
| VLPNDNFFEGK | 0.969 | 0.864 | 0.933 | 0.808 |
| QIIEQLSSGFFSPK | 0.691 | n/a | 1.428 | 1.428 |
| VAAAFPGDVDR | 1.140 | 0.739 | 0.631 | 0.641 |
| Average | 0.951 | 0.836 | 0.928 | 0.881 |
| CASEIN Peptide sequence | | | | |
| EDVPSER | 0.962 | 0.941 | 2.198 | 1.962 |
| HQGLPQEVLNENLLR | 0.828 | 0.701 | 1.736 | 2.090 |
| FFVAPFPEVFGK | 1.231 | 0.849 | 2.175 | 1.596 |
| Average | 1.007 | 0.830 | 2.036 | 1.883 |

Peptides whose sequences were confirmed by high-collision energy data are underlined in the above tables. Confirmation means that the probability of this peptide, given its accurate mass and the corresponding high-collision energy data, is larger than that of any other peptide in the database given the current fragmentation model. The remaining peptides are believed to be correct based on their retention time and mass compared to those for confirmed peptides. It was expected that there would be some experimental error in the results due to injection volume errors and other effects.

When using BSA as an internal reference, the relative abundance of Glycogen Phosphorylase B in the first sample was determined to be 0.925 (first analysis) and 1.119 (second analysis) giving an average of 1.0. The relative abundance of Glycogen Phosphorylase B in the second sample was determined to be 1.244 (first analysis) and 1.292 (second analysis) giving an average of 1.3. These results compare favourably with the expected value of 1.

Similarly, the relative abundance of Casein in the first sample was determined to be 0.980 (first analysis) and 1.111 (second analysis) giving an average of 1.0. The relative abundance of Casein in the second sample was determined to be 2.729 (first analysis) and 2.761 (second analysis) giving an average of 2.7. These results compare favourably with the expected values of 1 and 2–3.

The following data relates to chromatograms and mass spectra obtained from the first and second samples. One peptide having the sequence HQGLPQEVLNENLLR and derived from Casein elutes at almost exactly the same time as the peptide having the sequence LVNELTEFAK derived from BSA. Although this is an unusual occurrence, it provided an opportunity to compare the abundance of Casein in the two different samples.

Figure 11:
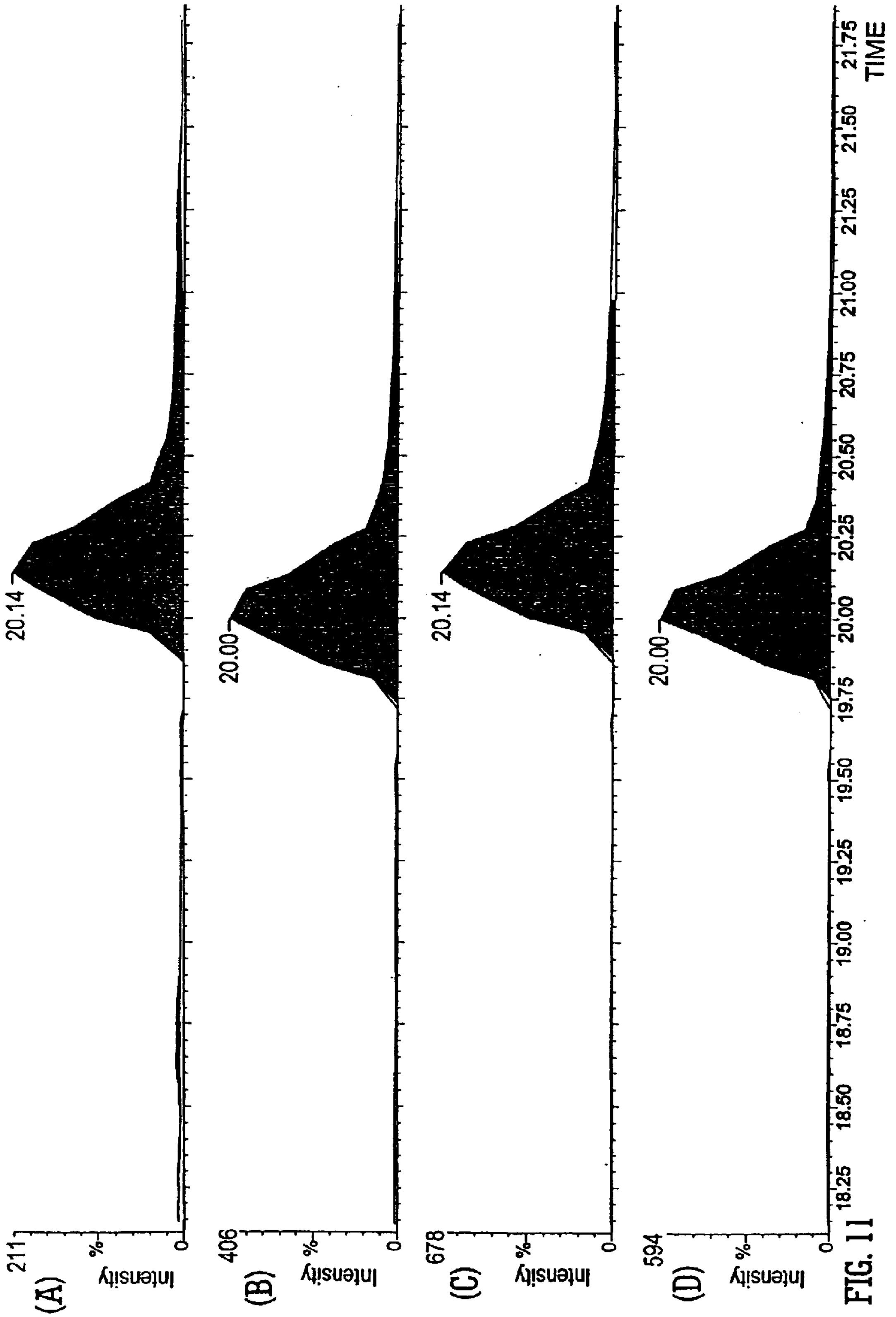
FIG. 11A shows a mass chromatogram of an ion from a first sample having a mass to charge ratio of 880.4.
FIG. 11B shows a similar mass chromatogram of the same ion from a second sample.
FIG. 11C shows a mass chromatogram of an ion from a first sample having a mass to charge ratio of 582.3
FIG. 11D shows a similar mass chromatogram of the same ion from a second sample.

FIGS. 11A–D show four mass chromatograms, two relating to the first sample and two relating to the second sample. FIG. 11A shows a mass chromatogram relating to the first sample for ions having a mass to charge ratio of 880.4 which corresponds with the peptide ion $(M+2H)^{++}$ having the sequence HQGLPQEVLNENLLR and which is derived from Casein. FIG. 11B shows a mass chromatogram relating to the second sample which corresponds with the same peptide ion having the sequence HQGLPQEVLNENLLR which is derived from Casein.

FIG. 11C shows a mass chromatogram relating to the first sample for ions having a mass to charge ratio of 582.3 which corresponds with the peptide ion $(M+2H)^{++}$ having the sequence LVNELTEFAK and which is derived from BSA. FIG. 11D shows a mass chromatogram relating to the second sample which corresponds with the same peptide ion having the sequence LVNELTEFAK and which is derived from BSA. The mass chromatograms show that the peptide ions having a mass to charge ratio of m/z 582.3 derived from BSA are present in both samples in roughly equal amounts whereas there is approximately a 100% difference in the intensity of peptide ion having a mass to charge ratio of 880.4 derived from Casein.

FIG. 12A show a parent ion mass spectrum recorded after around 20 minutes from the first sample and FIG. 12B shows a parent ion mass spectrum recorded after around substantially the same time from the second sample. The mass spectra show that the ions having a mass to charge ratio of 582.3 (derived from BSA) are approximately the same intensity in both mass spectra whereas ions having a mass to charge ratio of 880.4 which relate to a peptide ion from Casein are approximately twice the intensity in the second sample compared with the first sample. This is consistent with expectations.

Figure 12:
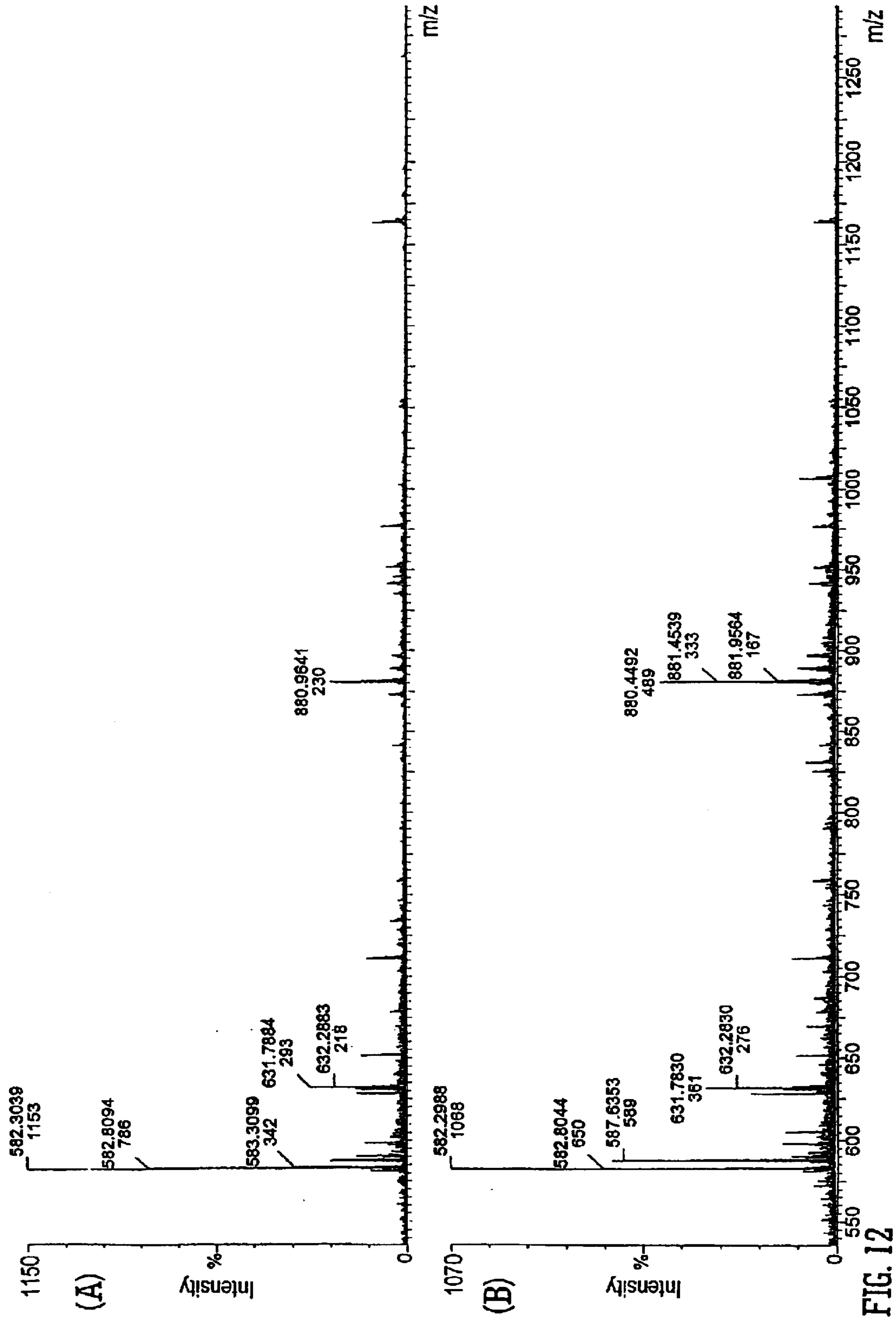
FIG. 12A shows a mass spectrum recorded from a first sample and FIG. 12B shows a corresponding mass spectrum recorded from a second sample which is similar to the first sample except that it contains a higher concentration of the digest products of the protein Casein which is common to both samples.
Figure 13:
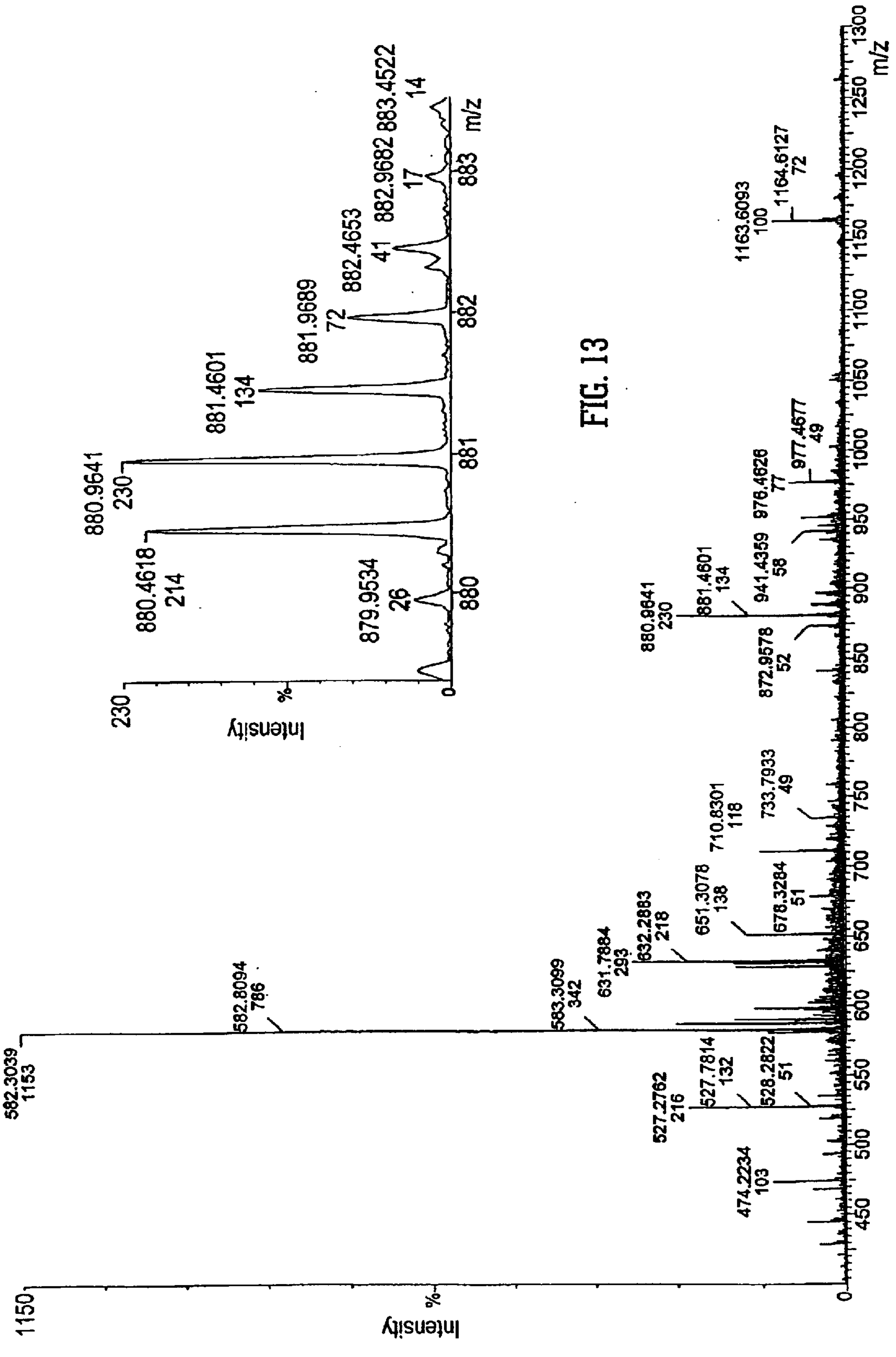
FIG. 13 shows the mass spectrum shown in FIG. 12A in more detail and the insert shows an expanded part of the mass spectrum showing isotope peaks at m/z 880.4.
Figure 14:
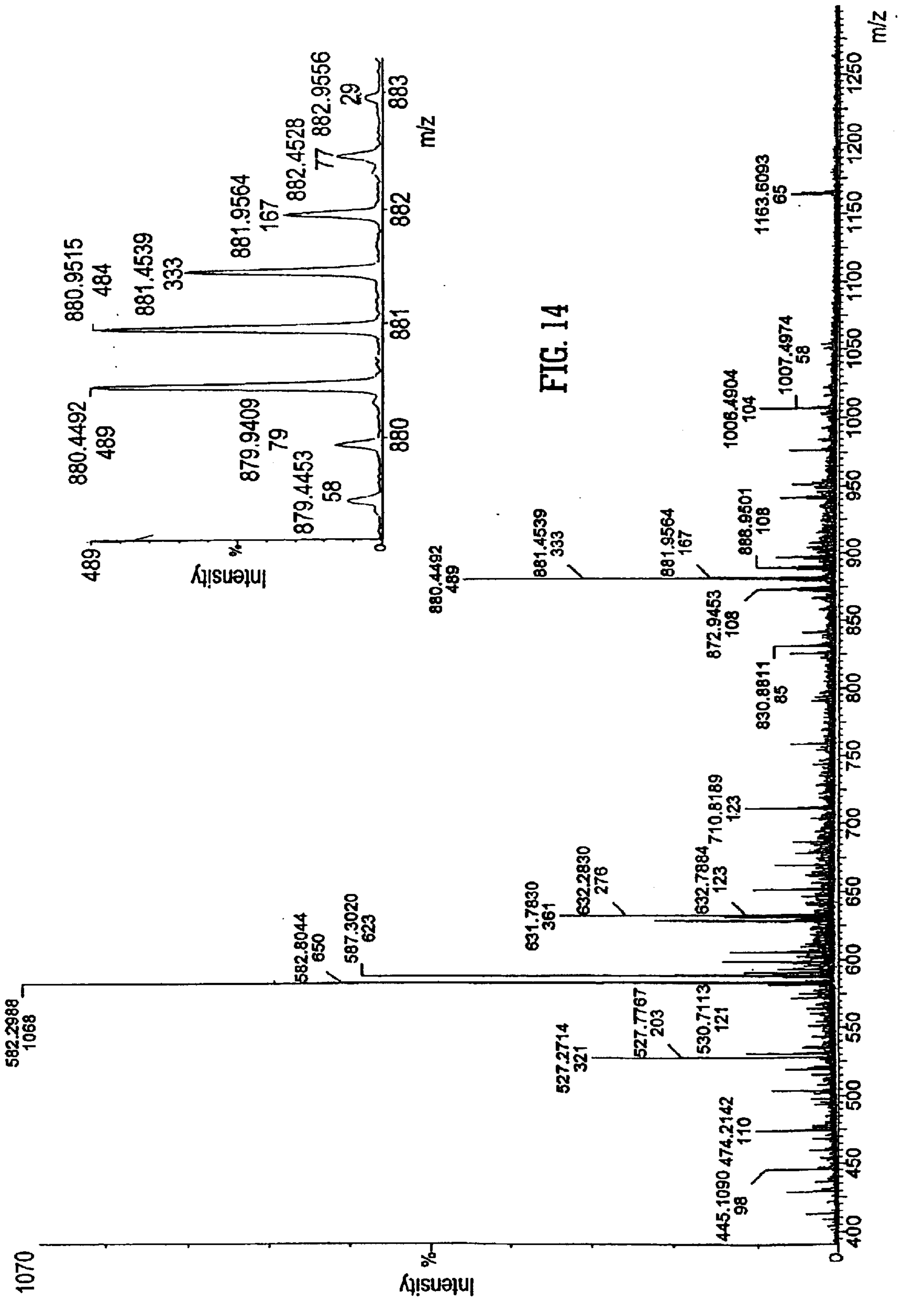
FIG. 14 shows the mass spectrum shown in FIG. 12B in more detail and the insert shows an expanded part of the mass spectrum showing isotope peaks at m/z 880.4.

FIG. 13 shows the parent ion mass spectrum shown in FIG. 12A in more detail. Peaks corresponding with BSA peptide ions having a mass to charge of 582.3 and peaks corresponding with the Casein peptide ions having a mass to charge ratio of 880.4 can be clearly seen. The insert shows the expanded part of the spectrum showing the isotope peaks of the peptide ion having a mass to charge ratio of 880.4. Similarly, FIG. 14 shows the parent ion mass spectrum shown in FIG. 12B in more detail. Again, peaks corresponding with BSA peptide ions having a mass to charge ratio of 582.3 and peaks corresponding with the Casein peptide ions having a mass to charge ratio of 880.4 can be clearly seen. The insert shows the expanded part of the spectrum showing the isotope peaks of the peptide ion having a mass to charge ratio of 880.4. It is apparent from FIGS. 12–14 and from comparing the inserts of FIGS. 13 and 14 that the abundance of the peptide ion derived from Casein which has a mass spectral peak of mass to charge ratio 880.4 is approximately twice the abundance in the second sample compared with the first sample.

What is claimed is:

1. A method of mass spectrometry comprising:

passing parent ions from a first sample to a fragmentation device;

repeatedly switching said fragmentation device between a high fragmentation mode wherein at least some of said parent ions from said first sample are fragmented into one or more fragment ions and a low fragmentation mode wherein substantially fewer parent ions are fragmented;

passing parent ions from a second sample to a fragmentation device;

repeatedly switching said fragmentation device between a high fragmentation mode wherein at least some of said parent ions are fragmented into one or more fragment ions and a low fragmentation mode wherein substantially fewer parent ions are fragmented;

automatically determining the intensity of first parent ions from said first sample which have a first mass to charge ratio;

automatically determining the intensity of second parent ions from said second sample which have said same first mass to charge ratio; and comparing the intensity of said first parent ions with the intensity of said second parent ions;

wherein if the intensity of said first parent ions differs from the intensity of said second parent ions by more than a predetermined amount then either said first parent ions and/or said second parent ions are considered to be parent ions of interest.

2. A method of mass spectrometry comprising:

passing parent ions from a first sample to a fragmentation device;

repeatedly switching said fragmentation device between a high fragmentation mode wherein at least some of said parent ions from said first sample are fragmented into one or more fragment ions and a low fragmentation mode wherein substantially fewer parent ions are fragmented;

passing parent ions from a second sample to a fragmentation device;

repeatedly switching said fragmentation device between a high fragmentation mode wherein at least some of said parent ions are fragmented into one or more fragment ions and a low fragmentation mode wherein substantially fewer parent ions are fragmented;

automatically determining the intensity of first parent ions from said first sample which have a first mass to charge ratio;

automatically determining the intensity of second parent ions from said second sample which have said same first mass to charge ratio;

determining a first ratio of the intensity of said first parent ions to the intensity of other parent ions in said first sample;

determining a second ratio of the intensity of said second parent ions to the intensity of other parent ions in said second sample; and comparing said first ratio with said second ratio;

wherein if said first ratio differs from said second ratio by more than a predetermined amount then either said first parent ions and/or said second parent ions are considered to be parent ions of interest.

3. A method as claimed in claim 2, wherein either said other parent ions present in said first sample and/or said other parent ions present in said second sample are endogenous to said sample.

4. A method as claimed in claim 2, wherein either said other parent ions present in said first sample and/or said other parent ions present in said second sample are exogenous to said sample.

5. A method as claimed in claims 2, wherein said other parent ions present in said first sample and/or said other parent ions present in said second sample are additionally used as a chromatographic retention time standard.

6. A method as claimed in claim 2, wherein said predetermined amount is selected from the group consisting of: (i) 1%; (ii) 10%; (iii) 50%; (iv) 100%; (v) 150%; (vi) 200%; (vii) 250%; (viii) 300%; (ix) 350%; (x) 400%; (xi) 450%; (xii) 500%; (xiii) 1000%; (xiv) 5000%; or (xv) 10000%.

7. A method as claimed in claim 2, wherein in said high fragmentation mode said fragmentation device is supplied with a voltage selected from the group consisting of: (i) greater than or equal to 15V; (ii) greater than or equal to 20V; (iii) greater than or equal to 25V; (iv) greater than or equal to 30V; (v) greater than or equal to 50V; (vi) greater than or equal to 100V; (vii) greater than or equal to 150V; and (viii) greater than or equal to 200V.

8. A method as claimed in claim 2, wherein in said low fragmentation mode said fragmentation device is supplied with a voltage selected from the group consisting of: (i) less than or equal to 5V; (ii) less than or equal to 4.5V; (iii) less than or equal to 4V; (iv) less than or equal to 3.5V; (v) less than or equal to 3V; (vi) less than or equal to 2.5V; (vii) less than or equal to 2V; (viii) less than or equal to 1.5V; (ix) less than or equal to 1V; (x) less than or equal to 0.5V; and (xi) substantially 0V.

9. A method as claimed in claim 2, wherein in said high fragmentation mode at least 50% of the ions entering the fragmentation device are arranged to have an energy greater than or equal to 10 eV for a singly charged ion or greater than or equal to 20 eV for a doubly charged ion such that said ions are caused to fragment upon colliding with collision gas in said fragmentation device.

10. A method as claimed in claim 2, wherein said fragmentation device is maintained at a pressure selected from the group consisting of: (i) greater than or equal to 0.0001 mbar; (ii) greater than or equal to 0.0005 mbar; (iii) greater than or equal to 0.001 mbar; (iv) greater than or equal to 0.005 mbar; (v) greater than or equal to 0.01 mbar; (vi) greater than or equal to 0.05 mbar; (vii) greater than or equal to 0.1 mbar; (viii) greater than or equal to 0.5 mbar; (ix) greater than or equal to 1 mbar; (x) greater than or equal to 5 mbar; and (xi) greater than or equal to 10 mbar.

11. A method as claimed in claim 2, wherein said fragmentation device is maintained at a pressure selected from the group consisting of: (i) less than or equal to 10 mbar; (ii) less than or equal to 5 mbar; (iii) less than or equal to 1 mbar; (iv) less than or equal to 0.5 mbar; (v) less than or equal to 0.1 mbar; (vi) less than or equal to 0.05 mbar; (vii) less than or equal to 0.01 mbar; (viii) less than or equal to 0.005 mbar; (ix) less than or equal to 0.001 mbar; (x) less than or equal to 0.0005 mbar; and (xi) less than or equal to 0.0001 mbar.

12. A method as claimed in claim 2, wherein collision gas in said fragmentation device is maintained at a first pressure when said fragmentation device is in said high fragmentation mode and at a second lower pressure when said fragmentation device is in said low fragmentation mode.

13. A method as claimed in claim 2, wherein collision gas in said fragmentation device comprises a first collision gas or a first mixture of collision gases when said fragmentation device is in said high fragmentation mode and a second different collision gas or a second different mixture of collision gases when said fragmentation device is in said low fragmentation mode.

14. A method as claimed in claim 2, further comprising the step of identifying said parent ions of interest.

15. A method as claimed in claim 14, wherein the step of identifying said parent ions of interest comprises determining the mass to charge ratio of said parent ions of interest.

16. A method as claimed in claim 15, wherein the mass to charge ratio of said parent ions of interest is determined to less than or equal to 20 ppm, 15 ppm, 10 ppm or 5 ppm.

17. A method as claimed in claim 15, further comprising comparing the determined mass to charge ratio of said parent ions of interest with a database of ions and their corresponding mass to charge ratios.

18. A method as claimed in claim 14, wherein said step of identifying said parent ions of interest comprises identifying one or more fragment ions which are determined to result from fragmentation of said parent ions of interest.

19. A method as claimed in claim 18, wherein said step of identifying one or more fragment ions further comprises determining the mass to charge ratio of said one or more fragment ions to less than or equal to 20 ppm, 15 ppm, 10 ppm or 5 ppm.

20. A method as claimed in claim 18, wherein the step of identifying parent ions of interest comprises determining whether said parent ions of interest are observed in a mass spectrum obtained when said fragmentation device is in said low fragmentation mode for a certain time period and said fragment ions are observed in a mass spectrum obtained either immediately before said certain time period, when said fragmentation device is in said high fragmentation mode, or immediately after said certain time period, when said fragmentation device is in said high fragmentation mode.

21. A method as claimed in claim 18, wherein the step of identifying said parent ions of interest comprises determining that the elution time of said parent ions of interest is substantially the same as the pseudo-elution time of said fragment ions.

22. A method as claimed in claim 18, wherein the step of identifying said parent ions of interest comprises comparing the elution profile of said parent ions of interest with the pseudo-elution profile of said fragment ions.

23. A method of mass spectrometry as claimed in claim 2, wherein ions are determined to be parent ions by comparing two mass spectra obtained one after the other, a first mass spectrum being obtained when said fragmentation device was in said high fragmentation mode and a second mass spectrum being obtained when said fragmentation device was in said low fragmentation mode, wherein ions are determined to be parent ions if a peak corresponding to said ions in said second mass spectrum is more intense than a peak corresponding to said ions in said first mass spectrum.

24. A method of mass spectrometry as claimed in claim 2, wherein ions are determined to be fragment ions by comparing two mass spectra obtained one after the other, a first mass spectrum being obtained when said fragmentation device was in said high fragmentation mode and a second mass spectrum being obtained when said fragmentation device was in said low fragmentation mode, wherein ions are determined to be fragment ions if a peak corresponding to said ions in said first mass spectrum is more intense than a peak corresponding to said ions in said second mass spectrum.

25. A method of mass spectrometry as claimed in claim 2, further comprising:

providing a mass filter upstream of said fragmentation device wherein said mass filter is arranged to transmit ions having mass to charge ratios within a first range but to substantially attenuate ions having mass to charge ratios within a second range; and wherein ions are determined to be fragment ions if they are determined to have a mass to charge ratio falling within said second range.

26. A method as claimed in claim 2, wherein said first parent ions and said second parent ions are determined to have mass to charge ratios which differ by less than or equal to 40 ppm, 35 ppm, 30 ppm, 25 ppm, 20 ppm, 15 ppm, 10 ppm or 5 ppm.

27. A method as claimed in claim 2, wherein said first parent ions and said second parent ions are determined to have eluted from a chromatography column after substantially the same elution time.

28. A method as claimed in claim 2, wherein said first parent ions are determined to give rise to one or more first fragment ions and said second parent ions are determined to give rise to one or more second fragment ions, wherein said one or more first fragment ions and said one or more second fragment ions have substantially the same mass to charge ratio.

29. A method as claimed in claim 28, wherein the mass to charge ratio of said one or more first fragment ions and said one or more second fragment ions are determined to differ by less than or equal to 40 ppm, 35 ppm, 30 ppm, 25 ppm, 20 ppm, 15 ppm, 10 ppm or 5 ppm.

30. A method as claimed in claim 2, wherein said first parent ions are determined to give rise to one or more first fragment ions and said second parent ions are determined to give rise to one or more second fragment ions and wherein said first parent ions and said second parent ions are observed in mass spectra relating to data obtained in said low fragmentation mode at a certain point in time and said one or more first and second fragment ions are observed in mass spectra relating to data obtained either immediately before said certain point in time when said fragmentation device is in said high fragmentation mode or immediately after said certain point in time when said fragmentation device is in said high fragmentation mode.

31. A method as claimed in claim 2, wherein said first parent ions are determined to give rise to one or more first fragment ions and said second parent ions are determined to give rise to one or more second fragment ions and wherein said first fragment ions have substantially the same pseudo-elution time as said second fragment ions.

32. A method as claimed in claim 2, wherein said first parent ions are determined to give rise to one or more first fragment ions and said second parent ions are determined to give rise to one or more second fragment ions and wherein said first parent ions are determined to have an elution profile which correlates with a pseudo-elution profile of said first fragment ions and wherein said second parent ions are determined to have an elution profile which correlates with a pseudo-elution profile of said second fragment ions.

33. A method as claimed in claim 2, wherein said first parent ions and said second parent ions are determined to be multiply charged.

34. A method as claimed in claim 2, wherein said first parent ions and said second parent ions are determined to have the same charge state.

35. A method as claimed in claim 2, wherein fragment ions which are determined to result from the fragmentation of said first parent ions are determined to have the same charge state as fragment ions which are determined to result from the fragmentation of said second parent ions.

36. A method as claimed in claim 2, wherein said first sample and/or said second sample comprise a plurality of different biopolymers, proteins, peptides, polypeptides, oligionucleotides, oligionucleosides, amino acids, carbohydrates, sugars, lipids, fatty acids, vitamins, hormones, portions or fragments of DNA, portions or fragments of cDNA, portions or fragments of RNA, portions or fragments of mRNA, portions or fragments of tRNA, polyclonal antibodies, monoclonal antibodies, ribonucleases, enzymes, metabolites, polysaccharides, phosphorylated peptides, phosphorylated proteins, glycopeptides, glycoproteins or steroids.

37. A method as claimed in claim 2, wherein said first sample and/or said second sample comprise at least 2, 5, 10, 20, 30, 40, 50, 60, 70, 80, 90, 100, 200, 300, 400, 500, 600, 700, 800, 900, 1000, 1500, 2000, 2500, 3000, 3500, 4000, 4500, or 5000 molecules having different identities.

38. A method as claimed in claim 2, wherein either: (i) said first sample is taken from a diseased organism and said second sample is taken from a non-diseased organism; (ii) said first sample is taken from a treated organism and said second sample is taken from a non-treated organism; or (iii) said first sample is taken from a mutant organism and said second sample is taken from a wild type organism.

39. A method as claimed in claim 2, wherein molecules from said first and/or second samples are separated from a mixture of other molecules prior to being ionised by: (i) High Performance Liquid Chromatography ("HPLC"); (ii) anion exchange; (iii) anion exchange chromatography; (iv) cation exchange; (v) cation exchange chromatography; (vi) ion pair reversed-phase chromatography; (vii) chromatography; (viii) single dimensional electrophoresis; (ix) multi-dimensional electrophoresis; (x) size exclusion; (xi) affinity; (xii) reverse phase chromatography; (xiii) Capillary Electrophoresis Chromatography ("CEC"); (xiv) electrophoresis; (xv) ion mobility separation; (xvi) Field Asymmetric Ion Mobility Separation ("FAIMS"); or (xvi) capillary electrophoresis.

40. A method as claimed in claim 2, wherein said first and second sample ions comprise peptide ions.

41. A method as claimed in claim 40, wherein said peptide ions comprise the digest products of one or more proteins.

42. A method as claimed in claim 40, further comprising the step of attempting to identify a protein which correlates with said parent ions of interest.

43. A method as claimed in claim 42, further comprising determining which peptide products are predicted to be formed when a protein is digested and determining whether any predicted peptide product(s) correlate with parent ions of interest.

44. A method as claimed in claim 42, further comprising determining whether said parent ions of interest correlate with one or more proteins.

45. A method as claimed in claim 2, wherein said first and second samples are taken from the same organism.

46. A method as claimed in claim 2, wherein said first and second samples are taken from different organisms.

47. A method as claimed in claim 2, further comprising the step of confirming that said first parent ions and/or said second parent ions are not fragment ions caused by fragmentation of parent ions in said fragmentation device.

48. A method as claimed in claim 47, further comprising:

comparing a high fragmentation mass spectrum relating to data obtained in said high fragmentation mode with a low fragmentation mass spectrum relating to data obtained in said low fragmentation mode, said mass spectra being obtained at substantially the same time; and determining that said first and/or said second parent ions are not fragment ions if said first and/or said second parent ions have a greater intensity in the low fragmentation mass spectrum relative to the high fragmentation mass spectrum.

49. A method as claimed in claim 2, wherein parent ions from said first sample and parent ions from said second sample are passed to the same fragmentation device.

50. A method as claimed in claim 2, wherein parent ions from said first sample and parent ions from said second sample are passed to different fragmentation devices.

51. A mass spectrometer comprising:

a fragmentation device repeatedly switched in use between a high fragmentation mode wherein at least some parent ions are fragmented into one or more fragment ions and a low fragmentation mode wherein substantially fewer parent ions are fragmented;

a mass analyser; and a control system which in use:

(i) determines the intensity of first parent ions from a first sample which have a first mass to charge ratio;

(ii) determines the intensity of second parent ions from a second sample which have said same first mass to charge ratio; and (iii) compares the intensity of said first parent ions with the intensity of said second parent ions;

wherein if the intensity of said first parent ions differs from the intensity of said second parent ions by more than a predetermined amount then either said first parent ions and/or said second parent ions are considered to be parent ions of interest.

52. A mass spectrometer comprising:

a fragmentation device repeatedly switched in use between a high fragmentation mode wherein at least some parent ions are fragmented into one or more fragment ions and a low fragmentation mode wherein substantially fewer parent ions are fragmented;

a mass analyser; and a control system which in use:

(i) determines the intensity of first parent ions from a first sample which have a first mass to charge ratio;

(ii) determines the intensity of second parent ions from said second sample which have said same first mass to charge ratio;

(iii) determines a first ratio of the intensity of said first parent ions to the intensity of other parent ions in said first sample;

(iv) determines a second ratio of the intensity of said second parent ions to the intensity of other parent ions in said second sample; and (v) compares said first ratio with said second ratio;

wherein if said first ratio differs from said second ratio by more than a predetermined amount then either said first parent ions and/or said second parent ions are considered to be parent ions of interest.

53. A mass spectrometer as claimed in claim 52, further comprising an ion source selected from the group consisting of: (i) an Electrospray ion source; (ii) an Atmospheric Pressure Chemical Ionization ("APCI") ion source; (iii) Atmospheric Pressure Photo Ionisation ("APPI") ion source; (iv) a Matrix Assisted Laser Desorption Ionisation ("MALDI") ion source; (v) a Laser Desorption Ionisation ("LDI") ion source; (vi) an Inductively Coupled Plasma ("ICP") ion source; (vi) a Fast Atom Bombardment ("FAB") ion source; and (vii) a Liquid Secondary Ions Mass Spectrometry ("LSIMS") ion source.

54. A mass spectrometer as claimed in claim 53, wherein said ion source is provided with an eluent over a period of time, said eluent having been separated from a mixture by means of liquid chromatography or capillary electrophoresis.

55. A mass spectrometer as claimed in claim 52, further comprising an ion source selected from the group consisting of: (i) an Electron Impact ("EI") ion source; (ii) a Chemical Ionization ("CI") ion source; and (iii) a Field Ionisation ("FI") ion source.

56. A mass spectrometer as claimed in claim 55, wherein said ion source is provided with an eluent over a period of time, said eluent having been separated from a mixture by means of gas chromatography.

57. A mass spectrometer as claimed in claim 52, wherein said mass analyser is selected from the group consisting of: (i) a quadrupole mass filter; (ii) a Time of Flight ("TOF") mass analyser; (iii) a 2D or 3D ion trap; (iv) a magnetic sector analyser; and (v) a Fourier Transform Ion Cyclotron Resonance ("FTICR") mass analyser.

58. A mass spectrometer as claimed in claim 52, wherein said fragmentation device is selected from the group consisting of: (i) a quadrupole rod set; (ii) an hexapole rod set; (iii) an octopole or higher order rod set; (iv) an ion tunnel comprising a plurality of electrodes having apertures through which ions are transmitted; and (v) a plurality of electrodes connected to an AC or RF voltage supply for radially confining ions within said fragmentation device.

59. A mass spectrometer as claimed in claim 58, wherein said fragmentation device forms a substantially gas-tight enclosure apart from an aperture to admit ions and an aperture for ions to exit from.

60. A mass spectrometer as claimed in claim 52, wherein in said high fragmentation mode said fragmentation device is supplied with a voltage selected from the group consisting of: (i) greater than or equal to 15V; (ii) greater than or equal to 20V; (iii) greater than or equal to 25V; (iv) greater than or equal to 30V; (v) greater than or equal to 50V; (vi) greater than or equal to 100V; (vii) greater than or equal to 150V; and (viii) greater than or equal to 200V.

61. A mass spectrometer as claimed in claim 52, wherein in said low fragmentation mode said fragmentation device is supplied with a voltage selected from the group consisting of: (i) less than or equal to 5V; (ii) less than or equal to 4.5V; (iii) less than or equal to 4V; (iv) less than or equal to 3.5V; (v) less than or equal to 3V; (vi) less than or equal to 2.5V; (vii) less than or equal to 2V; (viii) less than or equal to 1.5V; (ix) less than or equal to 1V; (x) less than or equal to 0.5V; and (xi) substantially 0V.

62. A mass spectrometer as claimed in claim 52, wherein in said high fragmentation mode at least 50% of the ions entering the fragmentation device are arranged to have an energy greater than or equal to 10 eV for a singly charged ion or an energy greater than or equal to 20 eV for a doubly charged ion so that said ions are caused to fragment upon colliding with collision gas in said fragmentation device.

63. A mass spectrometer as claimed in claim 52, wherein said fragmentation device is maintained at a pressure selected from the group consisting of: (i) greater than or equal to 0.0001 mbar; (ii) greater than or equal to 0.0005 mbar; (iii) greater than or equal to 0.001 mbar; (iv) greater than or equal to 0.005 mbar; (v) greater than or equal to 0.01 mbar; (vi) greater than or equal to 0.05 mbar; (vii) greater than or equal to 0.1 mbar; (viii) greater than or equal to 0.5 mbar; (ix) greater than or equal to 1 mbar; (x) greater than or equal to 5 mbar; and (xi) greater than or equal to 10 mbar.

64. A mass spectrometer as claimed in claim 52, wherein said fragmentation device is maintained at a pressure selected from the group consisting of: (i) less than or equal to 10 mbar; (ii) less than or equal to 5 mbar; (iii) less than or equal to 1 mbar; (iv) less than or equal to 0.5 mbar; (v) less than or equal to 0.1 mbar; (vi) less than or equal to 0.05 mbar; (vii) less than or equal to 0.01 mbar; (viii) less than or equal to 0.005 mbar; (ix) less than or equal to 0.001 mbar; (x) less than or equal to 0.0005 mbar; and (xi) less than or equal to 0.0001 mbar.

65. A mass spectrometer as claimed in claim 52, wherein collision gas in said fragmentation device is maintained at a first pressure when said fragmentation device is in said high fragmentation mode and at a second lower pressure when said fragmentation device is in said low fragmentation mode.

66. A mass spectrometer as claimed in claim 52, wherein collision gas in said fragmentation device comprises a first collision gas or a first mixture of collision gases when said fragmentation device is in said high fragmentation mode and a second different collision gas or a second different mixture of collision gases when said fragmentation device is in said low fragmentation mode.

67. A mass spectrometer as claimed in claim 52, wherein parent ions from said first sample and parent ions from said second sample are passed to the same fragmentation device.

68. A mass spectrometer as claimed in claim 52, wherein parent ions from said first sample and parent ions from said second sample are passed to different fragmentation devices.

69. A mass spectrometer as claimed in claim 52, wherein molecules from said first and/or second samples are separated from a mixture of other molecules prior to being ionised by: (i) High Performance Liquid Chromatography ("HPLC"); (ii) anion exchange; (iii) anion exchange chromatography; (iv) cation exchange; (v) cation exchange chromatography; (vi) ion pair reversed-phase chromatography; (vii) chromatography; (viii) single dimensional electrophoresis; (ix) multi-dimensional electrophoresis; (x) size exclusion; (xi) affinity; (xii) reverse phase chromatography; (xiii) Capillary Electrophoresis Chromatography ("CEC"); (xiv) electrophoresis; (xv) ion mobility separation; (xvi) Field Asymmetric Ion Mobility Separation ("FAIMS"); or (xvi) capillary electrophoresis.

70. A method of mass spectrometry comprising:

passing parent ions from a first sample to a fragmentation device;

repeatedly switching said fragmentation device between a high fragmentation mode wherein at least some of said parent ions from said first sample are fragmented into one or more fragment ions and a low fragmentation mode wherein substantially fewer parent ions are fragmented;

passing parent ions from a second sample to a fragmentation device;

repeatedly switching said fragmentation device between a high fragmentation mode wherein at least some of said parent ions are fragmented into one or more fragment ions and a low fragmentation mode wherein substantially fewer parent ions are fragmented;

automatically determining the intensity of first fragment ions derived from first parent ions from said first sample, said first fragment ions having a first mass to charge ratio;

automatically determining the intensity of second fragment ions derived from second parent ions from said second sample, said second fragment ions having said same first mass to charge ratio; and comparing the intensity of said first fragment ions with the intensity of said second fragment ions;

wherein if the intensity of said first fragment ions differs from the intensity of said second fragment ions by more than a predetermined amount then either said first parent ions and/or said second parent ions are considered to be parent ions of interest.

71. A method of mass spectrometry comprising:

passing parent ions from a first sample to a fragmentation device;

repeatedly switching said fragmentation device between a high fragmentation mode wherein at least some of said parent ions from said first sample are fragmented into one or more fragment ions and a low fragmentation mode wherein substantially fewer parent ions are fragmented;

passing parent ions from a second sample to a fragmentation device;

repeatedly switching said fragmentation device between a high fragmentation mode wherein at least some of said parent ions are fragmented into one or more fragment ions and a low fragmentation mode wherein substantially fewer parent ions are fragmented;

automatically determining the intensity of first fragment ions derived from first parent ions from said first sample, said first fragment ions having a first mass to charge ratio;

automatically determining the intensity of second fragment ions derived from second parent ions from said second sample, said second fragment ions having said same first mass to charge ratio;

determining a first ratio of the intensity of said first fragment ions to the intensity of other parent ions in said first sample or with the intensity of other fragment ions derived from other parent ions in said first sample;

determining a second ratio of the intensity of said second fragment ions to the intensity of other parent ions in said second sample or with the intensity of other fragment ions derived from other parent ions in said second sample;

comparing said first ratio with said second ratio;

wherein if said first ratio differs from said second ratio by more than a predetermined amount then either said first parent ions and/or said second parent ions are considered to be parent ions of interest.

72. A mass spectrometer comprising:

a fragmentation device repeatedly switched in use between a high fragmentation mode wherein at least some parent ions are fragmented into one or more fragment ions and a low fragmentation mode wherein substantially fewer parent ions are fragmented;

a mass analyser; and a control system which in use:

(i) determines the intensity of first fragment ions derived from first parent ions from said first sample, said first fragment ions having a first mass to charge ratio;

(ii) determines the intensity of second fragment ions derived from second parent ions from said second sample, said second fragment ions having said same first mass to charge ratio; and (iii) compares the intensity of said first fragment ions with the intensity of said second fragment ions;

wherein if the intensity of said first fragment ions differs from the intensity of said second fragment ions by more than a predetermined amount then either said first parent ions and/or said second parent ions are considered to be parent ions of interest.

73. A mass spectrometer comprising:

a fragmentation device repeatedly switched in use between a high fragmentation mode wherein at least some parent ions are fragmented into one or more fragment ions and a low fragmentation mode wherein substantially fewer parent ions are fragmented;

a mass analyser; and a control system which in use:

(i) determines the intensity of first fragment ions derived from first parent ions from said first sample, said first fragment ions having a first mass to charge ratio;

(ii) determines the intensity of second fragment ions derived from second parent ions from said second sample, said second fragment ions having said same first mass to charge ratio;

(iii) determines a first ratio of the intensity of said first fragment ions to the intensity of other parent ions in said first sample or with the intensity of other fragment ions derived from other parent ions in said first sample;

(iv) determines a second ratio of the intensity of said second fragment ions to the intensity of other parent ions in said second sample or with the intensity of other fragment ions derived from other parent ions in said second sample; and (v) compares said first ratio with said second ratio;

wherein if said first ratio differs from said second ratio by more than a predetermined amount then either said first parent ions and/or said second parent ions are considered to be parent ions of interest.

* * * * *